(12) United States Patent
Nakamura

(10) Patent No.: US 9,628,650 B2
(45) Date of Patent: Apr. 18, 2017

(54) IMAGE READING DEVICE SELECTING READING POSITION ON THE BASIS OF DEFECTIVE FACTORS

(71) Applicant: BROTHER KOGYO KABUSHIKI KAISHA, Nagoya, Aichi (JP)

(72) Inventor: Naoyuki Nakamura, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/946,897

(22) Filed: Nov. 20, 2015

(65) Prior Publication Data

US 2016/0191738 A1 Jun. 30, 2016

(30) Foreign Application Priority Data

Dec. 24, 2014 (JP) ................................. 2014-259938

(51) Int. Cl.
  *G06K 15/00* (2006.01)
  *H04N 1/00* (2006.01)
  *H04N 1/10* (2006.01)
  *H04N 1/04* (2006.01)

(52) U.S. Cl.
  CPC ....... *H04N 1/00803* (2013.01); *H04N 1/0032* (2013.01); *H04N 1/0057* (2013.01); *H04N 1/1061* (2013.01); *H04N 2201/0094* (2013.01)

(58) Field of Classification Search
  CPC ............. H04N 1/00803; H04N 1/0032; H04N 1/0057; H04N 1/1061; H04N 2201/0094
  USPC ..... 358/1.1, 1.12, 1.14, 3.26, 461, 474, 491, 358/488
  See application file for complete search history.

(56) References Cited

U.S. PATENT DOCUMENTS

| 5,880,828 | A   | * | 3/1999  | Nakamura | G01N 21/94 356/237.3 |
| 6,563,938 | B1  | * | 5/2003  | Harada   | G06K 9/32 358/461    |
| 8,320,029 | B2  | * | 11/2012 | Kamei    | H04N 1/00002 358/483 |
| 2003/0090742 | A1 | * | 5/2003 | Fukuda   | H04N 1/04 358/448    |

(Continued)

FOREIGN PATENT DOCUMENTS

| JP | 2002-185706 A | 6/2002 |
| JP | 2006-060493 A | 3/2006 |

*Primary Examiner* — Gabriel Garcia
(74) *Attorney, Agent, or Firm* — Scully, Scott, Murphy & Presser, PC

(57) ABSTRACT

In an image reading device, a reading unit reads information at a reading position. The reading position is selected from lines arranged in a prescribed range in a sub-scanning direction. A processor detects whether there is a defective pixel in one line worth of pixels and stores a position of the detected defective pixel as a defective position in a storing unit. The processor calculates defective factors for normal positions. Each of the normal positions indicates one of the plurality of lines having no defective pixel. The closer a distance between the normal position and a defective position positioned within a specific range from the normal position is, the larger a defective factor of the normal position is set. The processor sets a position having a smallest defective factor from among the normal positions. The reading unit reads the original conveyed by the sheet conveying unit at the set position.

8 Claims, 8 Drawing Sheets

(56) References Cited

U.S. PATENT DOCUMENTS

2007/0237399 A1* 10/2007 Satonaga ............. G06K 9/4647
  382/225
2016/0094749 A1* 3/2016 Sahara ............... H04N 1/00909
  358/474

* cited by examiner

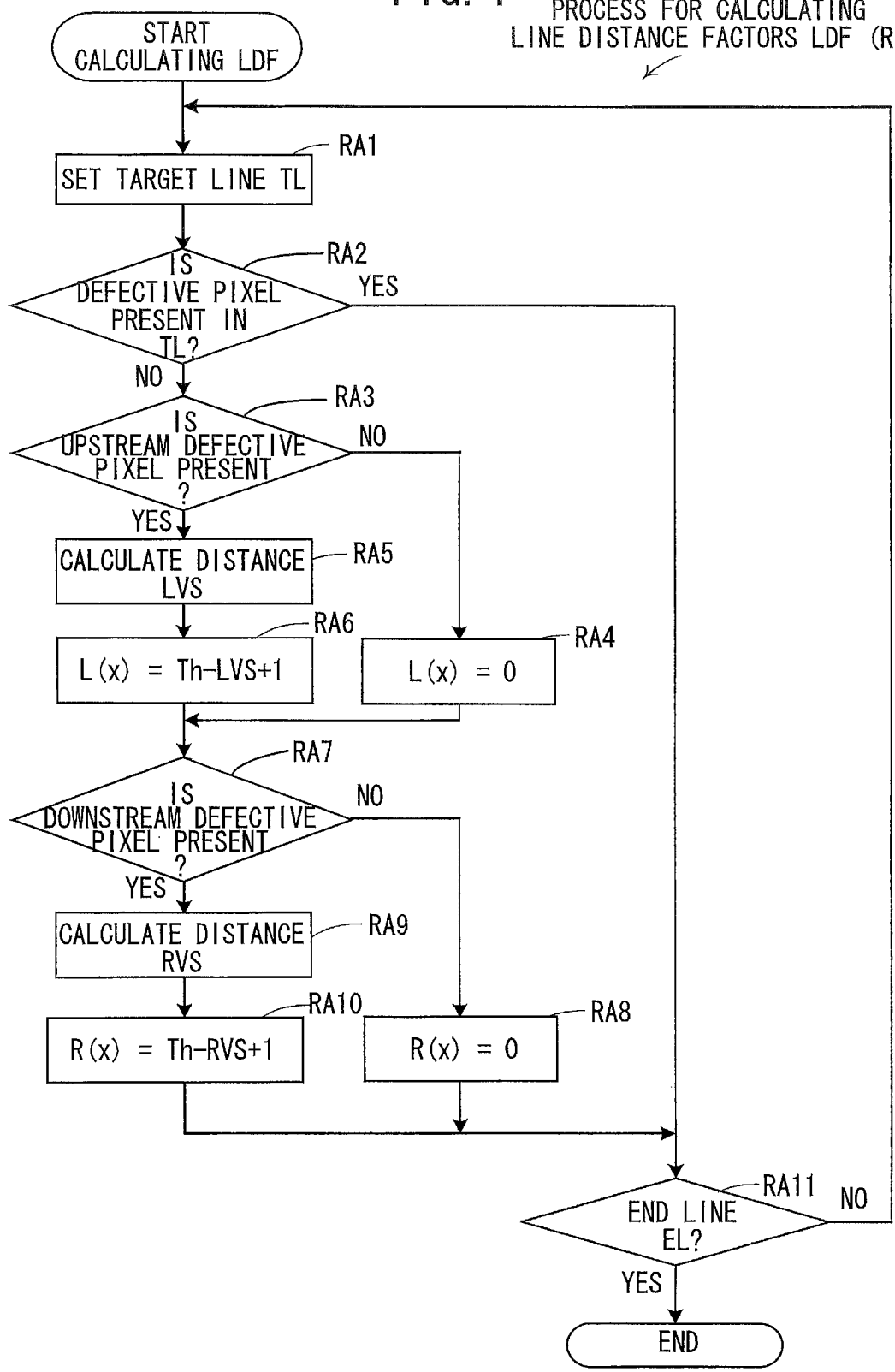

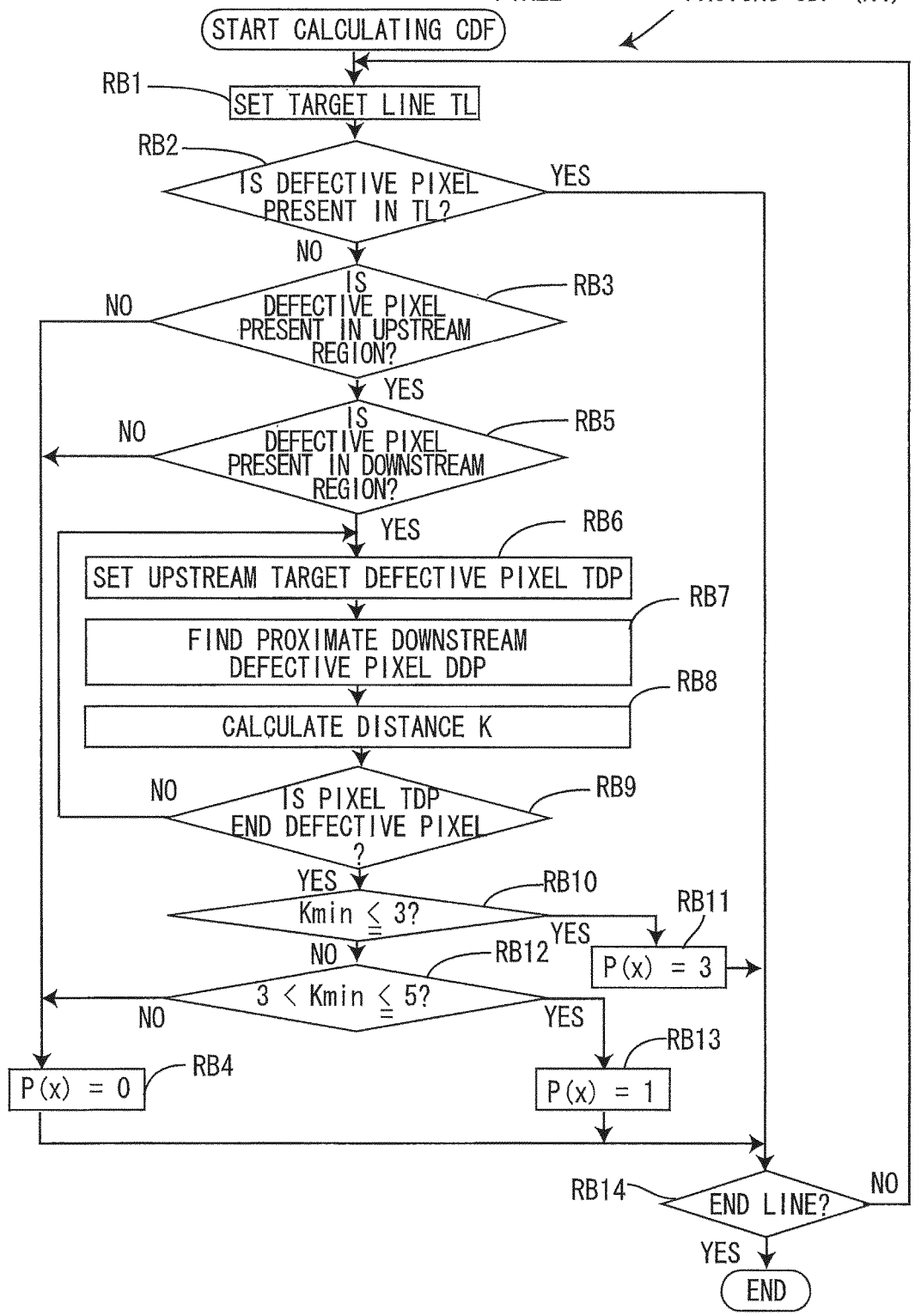

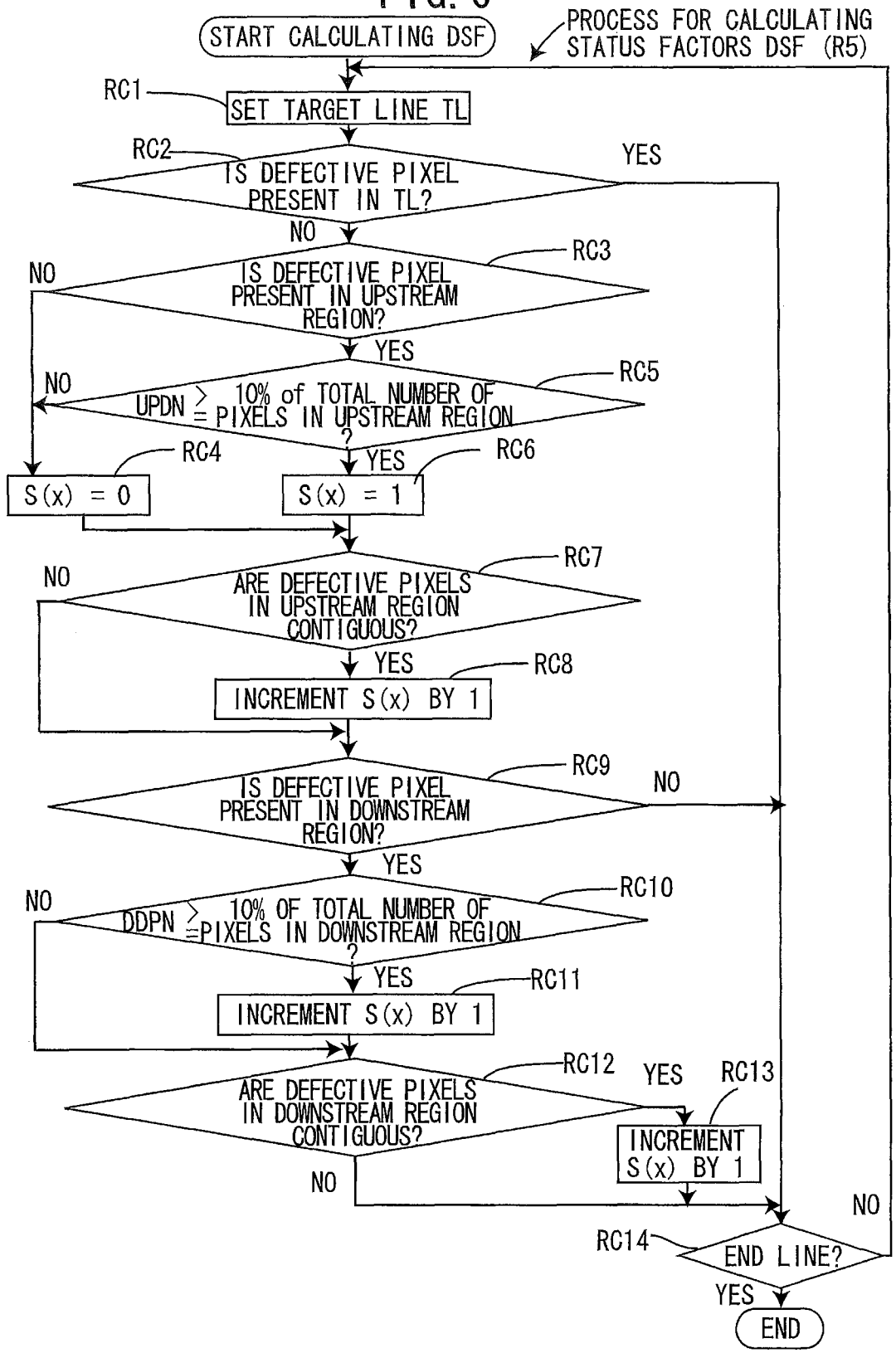

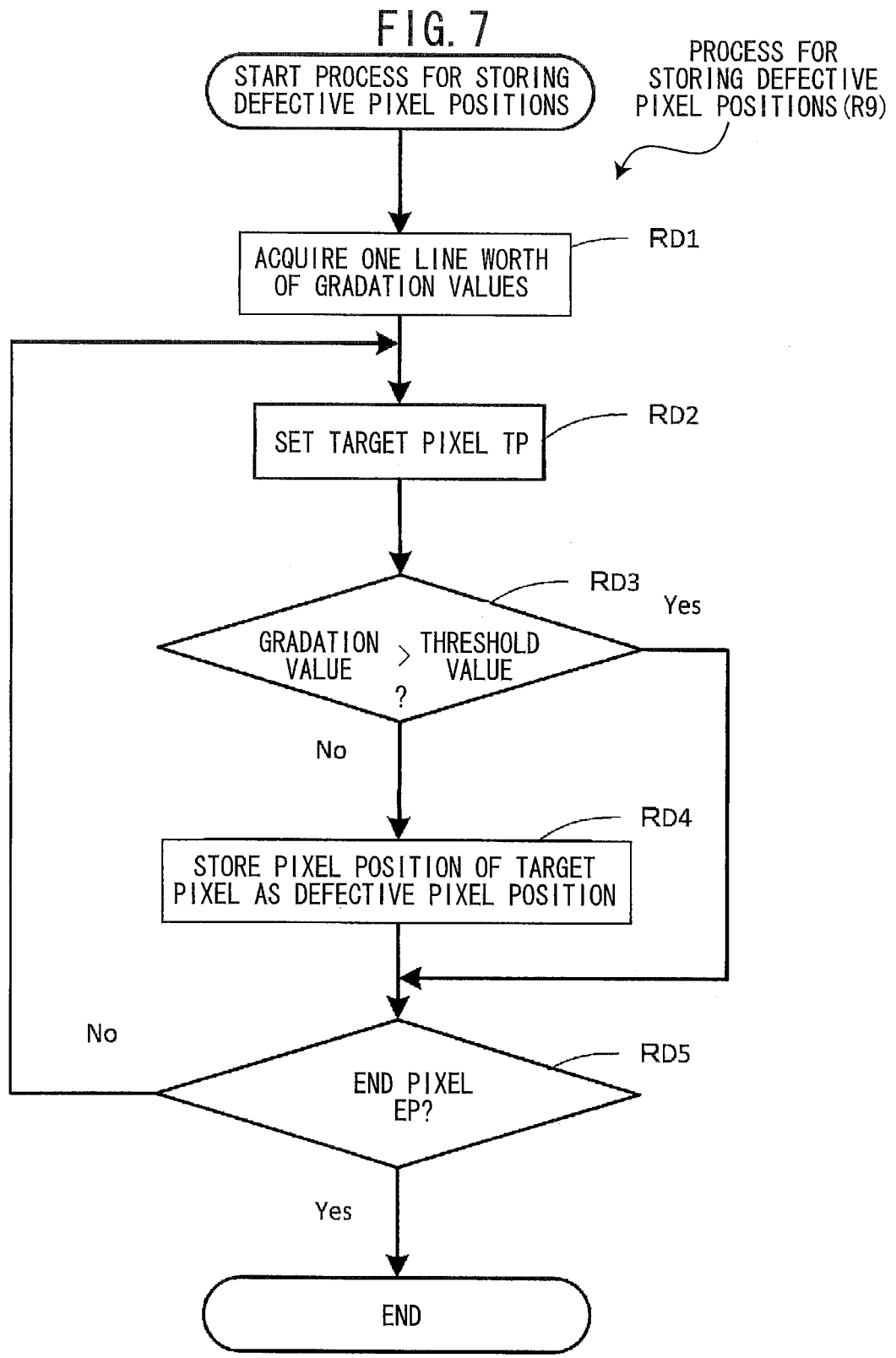

FIG. 8(a)
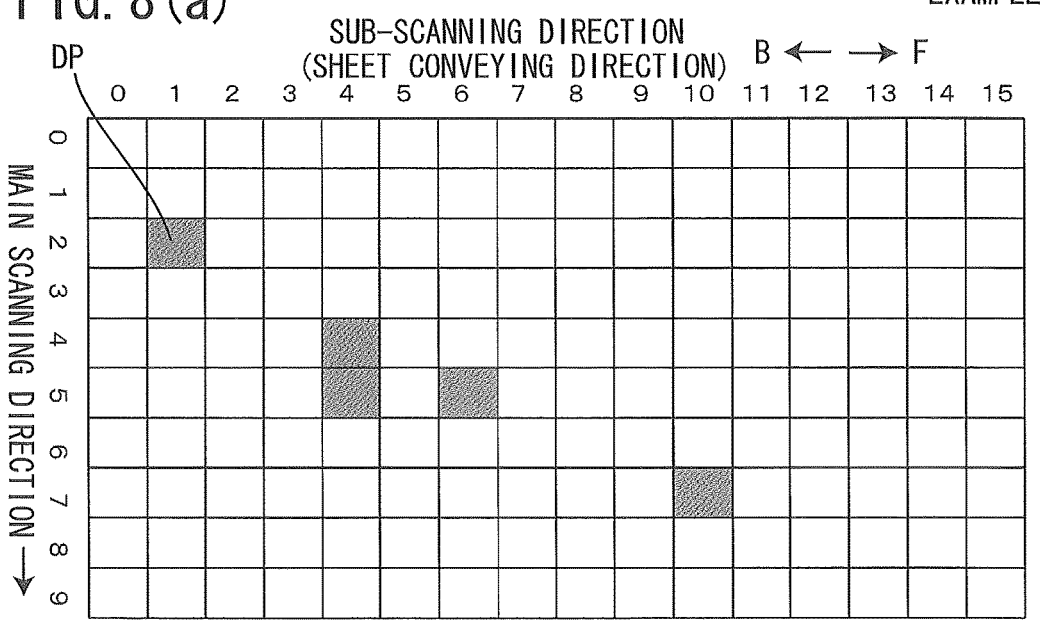
FIG. 8(b)
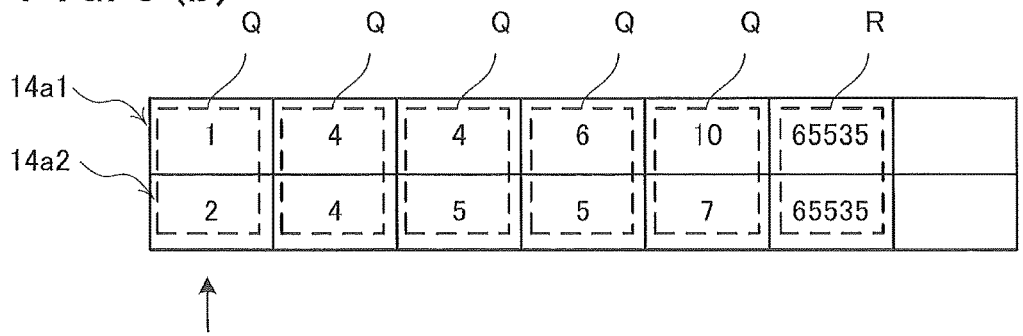
FIG. 8(c)
LINE DISTANCE FACTORS LDF
L(0)=0,L(2)=2,L(3)=1,L(5)=2,L(7)=2,L(8)=1,L(9)=0,L(11)=2,L(12)=1,L(13)=0,L(14)=0,L(15)=0
R(0)=2,R(2)=1,R(3)=2,R(5)=2,R(7)=0,R(8)=1,R(9)=2,R(11)=0,R(12)=0,R(13)=0,R(14)=0,R(15)=0
CLOSE PIXEL DISTANCE FACTORS CDF
P(0)=0,P(2)=1,P(3)=1,P(5)=3,P(7)=0,P(8)=1,P(9)=0,P(11)=0,P(12)=0,P(13)=0,P(14)=0,P(15)=0
STATUS FACTORS DSF
S(0)=0,S(2)=2,S(3)=2,S(5)=2,S(7)=0,S(8)=0,S(9)=0,S(11)=0,S(12)=0,S(13)=0,S(14)=0,S(15)=0

IMAGE READING DEVICE SELECTING READING POSITION ON THE BASIS OF DEFECTIVE FACTORS

CROSS REFERENCE TO RELATED APPLICATION

This application claims priority from Japanese Patent Application No. 2014-259938 filed Dec. 24, 2014. The entire content of the priority application is incorporated herein by reference.

TECHNICAL FIELD

The present disclosure relates to an image reading device.

BACKGROUND

In an conventional image reading device, a reading device positioned at the reading position reads an image of an original document while the original document is conveyed. In such type of image reading device, if dust such as paper dust exists between the reading device and the original document, the reading device reads the dust. Accordingly, unwanted line is generated in the image read by the image reading device, Japanese Patent Application Publication No. 2006-60493 discloses an image reading device, in which dust level is detected at a plurality of reading positions by displacing a reading device to the plurality of reading positions in a sub-scanning direction prior to start of image reading operation. A position where variation in dust level is small will be determined as an ultimate reading position.

SUMMARY

According to the disclosed structure, the ultimate reading position is selected even if dust exists near the ultimate reading position. Therefore, unwanted line may be generated in the output image, if the dust ambient to the ultimate reading position is slightly displaced.

It is therefore an object of the present disclosure to provide an image reading device capable of avoiding generation of unwanted line in the output image despite of the displacement of the dust. The object will be attained by determining an ultimate reading position by taking into consideration of influence of dust ambient to the reading position.

In order to attain the above and other objects, the disclosure provides an image reading device. The image reading device includes a sheet conveying unit, a reading unit, a pressing member, a drive unit, a storing unit, and a processor. The sheet conveying unit is configured to convey an original in a sub-scanning direction. The reading unit is configured to read information made up of pixels on a line-to-line basis at a reading position, the reading position being selected from a plurality of lines arranged in a prescribed range in the sub-scanning direction. Each of the plurality of lines extends in a main scanning direction. The pressing member is configured to press the original conveyed by the sheet conveying unit toward the reading unit. The drive unit is configured to move the reading unit in the sub-scanning direction so that the reading unit is positioned at the reading position. The processor configured to: control the reading unit to read the pressing member to obtain one line worth of pixels at a reading position and detect whether there is a defective pixel in the one line worth of pixels; store a position of the detected defective pixel as a defective position in the storing unit; calculate defective factors for normal positions, each of the normal positions being a position in the sub-scanning direction and indicating one of the plurality of lines having no defective pixel, wherein the closer a distance between the each of the normal positions and a defective position positioned within a specific range from the each of the normal positions is, the larger a defective factor of the each of the normal positions is set; and set a reading position having a smallest defective factor from among the normal positions, wherein the reading unit reads the original conveyed by the sheet conveying unit at the set reading position.

According to another aspects, the disclosure provides an image reading device. The image reading device includes a sheet conveying unit, a reading unit, a pressing member, a drive unit, a storing unit, and a processor. The sheet conveying unit is configured to convey an original in a sub-scanning direction. The reading unit is configured to read information made up of pixels on a line-to-line basis at a reading position. The reading position is selected from a plurality of lines arranged in a prescribed range in the sub-scanning direction. Each of the plurality of lines extends in a main scanning direction. The pressing member is configured to press the original conveyed by the sheet conveying unit toward the reading unit. The drive unit is configured to move the reading unit in the sub-scanning direction so that the reading unit is positioned at the reading position. The processor is configured to: control the reading unit to read the pressing member to obtain one line worth of pixels at a reading position and detect whether there is a defective pixel in the one line worth of pixels; store a position of the detected defective pixel as a defective position in the storing unit; acquire a first distance between a first normal position and a defective position positioned within a first specific range from the first normal position, the first normal position being a position in the sub-scanning direction and indicating one of the plurality of lines having no defective pixel; acquire a second distance between a second normal position and a defective position positioned within a second specific range from the second normal position, the second normal position being a position in the sub-scanning direction, indicating one of the plurality of lines having no defective pixel, and different from the first normal position; set a reading position to the first normal position when the first distance is longer than the second distance; and set a reading position to the second normal position when the second distance is longer than the first distance. The reading unit reads the original conveyed by the sheet conveying unit at the set reading position.

According to another aspects, the disclosure provides an image reading device. The image reading device includes a sheet conveying unit, a reading unit, a pressing member, a drive unit, a storing unit, and a processor. The sheet conveying unit is configured to convey an original in a sub-scanning direction. The reading unit is configured to read information made up of pixels on a line-to-line basis at a reading position. The reading position is selected from a plurality of lines arranged in a prescribed range in the sub-scanning direction. Each of the plurality of lines extends in a main scanning direction. The pressing member is configured to press the original conveyed by the sheet conveying unit toward the reading unit. The drive unit is configured to move the reading unit in the sub-scanning direction so that the reading unit is positioned at the reading position. The processor is configured to: control the reading unit to read the pressing member to obtain one line worth of pixels at a reading position and detect whether there is a defective pixel in the one line worth of pixels; store a position of the detected defective pixel as a defective position in the storing unit; acquire distances for normal positions, each of the normal positions being a position in the sub-scanning direction and indicating one of the plurality of lines having no defective pixel, each of the distances being between a respective normal position and a defective pixel position positioned within a specific range from the respective normal position; and set a reading position to one of the normal positions having a largest distance among the acquired distances. The reading unit reads the original conveyed by the sheet conveying unit at the set reading position.

BRIEF DESCRIPTION OF THE DRAWINGS

The particular features and advantages of the disclosure as well as other objects will become apparent from the following description taken in connection with the accompanying drawings, in which:

FIG. 4 is a flowchart illustrating a process executed in the embodiment for calculating line distance factors LDF in the embodiment;

FIG. 5 is a flowchart illustrating a process executed in the embodiment for calculating close pixel distance factors CDF;

FIG. 6 is a flowchart illustrating a process executed in the embodiment for calculating status factors DSF in the embodiment;

FIG. 7 is a flowchart illustrating a process executed in the embodiment for storing defective pixel positions;

FIG. 8(a) is a view for description of positions of defective pixels;

FIG. 8(b) is a view of a pattern diagram of a storage area indicative of positions of dusts in connection with FIG. 8(a); and FIG. 8(c) is a view illustrating examples of the line distance factors LDF, the close pixel distance factors CDF, and the status factors DSF in connection with FIGS. 8(a) and 8(b).

DETAILED DESCRIPTION

Figure 1:
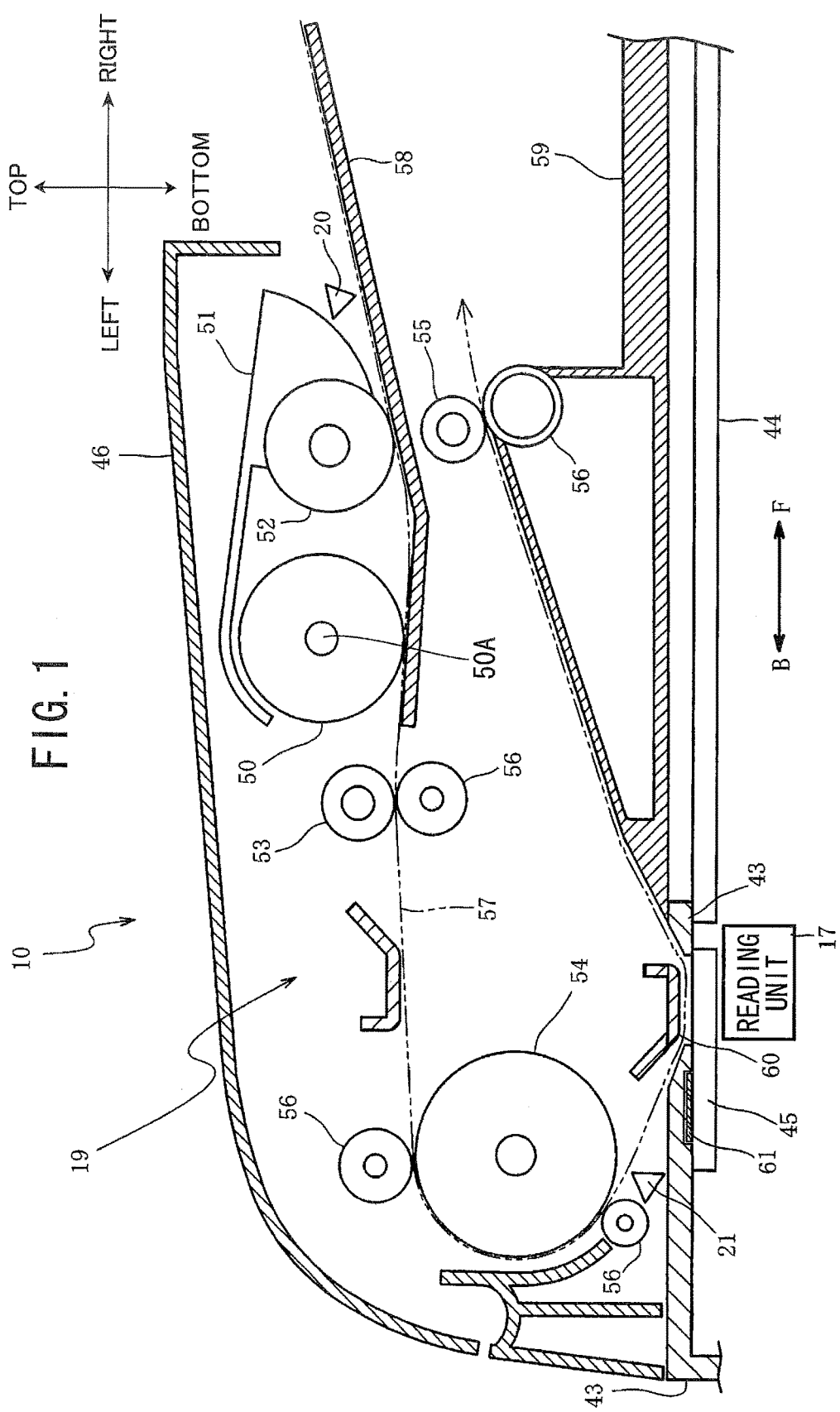
FIG. 1 is a schematic cross-sectional view of an image reading device according to an embodiment
Figure 2:
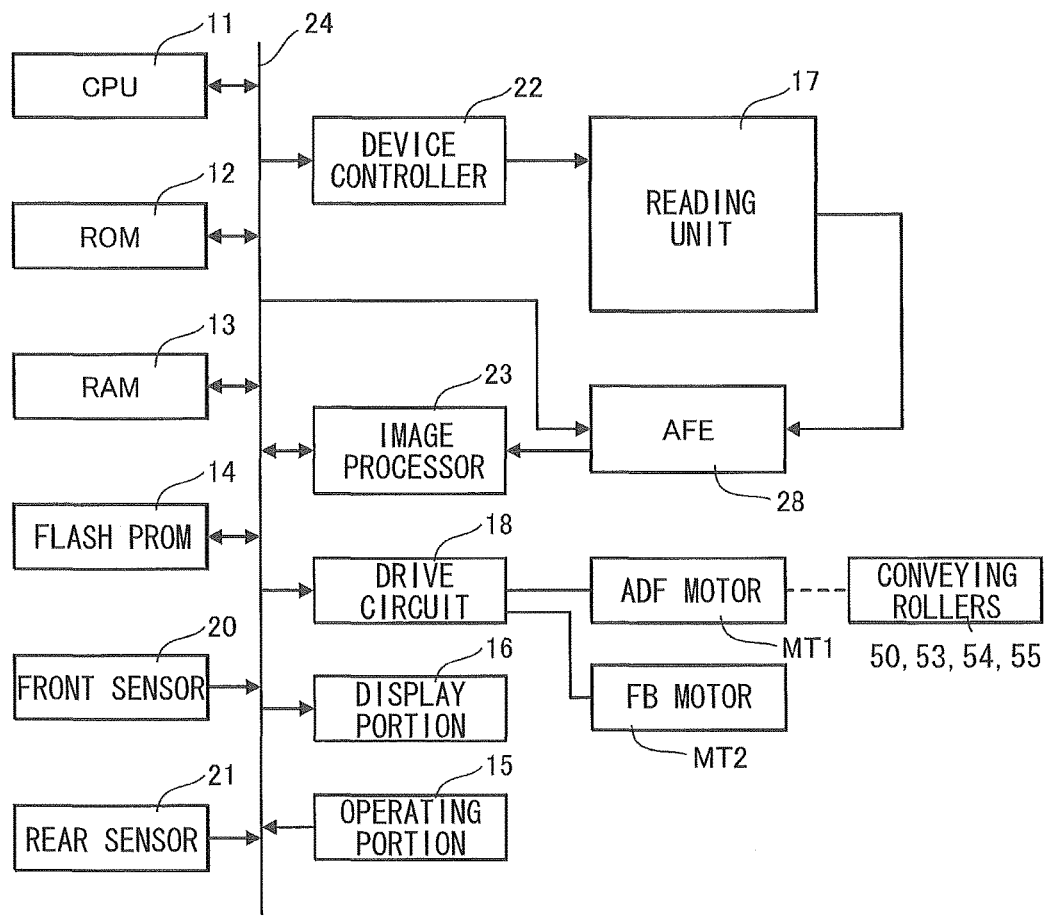
FIG. 2(a) is a block diagram showing an electrical configuration in the image reading device according to the embodiment.
FIG. 2(b) is a pattern diagram of storage regions of a flash PROM indicative of positions of dusts in the image reading device according to the embodiment.

An image reading device 10 according to one embodiment will be described with reference to FIGS. 1 through 8(c). In FIG. 1, vertical direction and leftward/rightward direction are shown by arrows.

[Mechanical Structure of Image Reading Device 10]

As illustrated in FIG. 1, the image reading device 10 includes a generally box-shaped casing 43, and an original document cover 46 provided at an upper portion of the casing 43. Further, a first platen glass 44, and a second platen glass 45 are provided at the upper portion of the casing 43. A white reference plate 61 is fixed between the second platen glass 45 and the casing 43. The reference plate 61 is white which is a background color of an original document GS.

The original document cover 46 is pivotally movably connected to the casing 43 between a closed posture covering the platen glasses 44, 45 and an open posture not covering the platen glasses 44, 45. The original document cover 46 is provided with an Automatic Document Feeder (ADF) 19, an original document tray 58, and a discharge tray 59.

A document conveying passage 57 extends from the original document tray 58 to the discharge tray 59, and a reading unit 17 is provided along the conveying passage 57. The ADF 19 is configured to convey the original document set at the document tray 58 to the reading unit 17 and then to the discharge tray 59 along the conveying passage 57.

A separation roller 50, an arm 51, a suction roller 52, a plurality of conveyer rollers 53, 54, a discharge roller 55, and a plurality of follower rollers 56 are provided Inside the ADF 19. The plurality of follower rollers 56 is in pressure contact with the corresponding rollers 53, 54, 55. The separation roller 50 is rotatable about an axis of a shaft 50A. The arm 51 has a base end portion pivotally movable about the axis of the shaft 50A, and a free end portion to which the suction roller 52 is rotatably supported. The original document is conveyed along the conveyer passage 57 by these rollers, moving past a reading position at which an image on the original document is read by the reading unit 17, and is then discharged onto the discharge tray 59. The reading position is provided by a plurality of positions, and can be altered by moving the reading unit 17 in a sub-scanning direction B-F within a predetermined scanning area. A drive circuit 18 (FIG. 2(a)) is provided for moving the reading unit 17 in the sub-scanning direction B-F.

The reading unit 17 is accommodated in an interior of the casing 43, and an original pressing plate 60 is positioned to face with the reading unit 17 through the second platen glass 45. In a case of reading an image on the original document conveyed by the ADF 19, the reading unit 17 is stopped at a position facing the original pressing plate 60 through the second platen glass 45 as a reading position, and reads the image through the second platen glass 45 while a color of a light source (not shown) is sequentially converted. On the other hand, in a case of reading an image on the original document positioned at the first platen glass 44, the reading unit 17 reads the image on the original document with sequentially converting color of the light source, while the reading unit 17 is moved at a constant speed in the sub-scanning direction F-B by the drive circuit 18.

The original pressing plate 60 is provided at a position allowing the reading unit 17 to perform image reading through the second platen glass 45. The original document conveyed by the ADF 19 contacts the pressing plate 60 thereby being pressed toward the reading unit 17. The original pressing plate 60 is white colored with a constant color density. In the depicted embodiment, the reading unit 17 reads the original pressing plate 60 for detecting possibility of generation of degraded image caused by dust on the second platen glass 45, after image reading operation is performed.

A front sensor 20 is provided to detect an original document set at the original document tray 58. A rear sensor 21 is provided to determine a timing for starting image reading operation by the reading unit 17. More specifically, the reading unit 17 starts reading of an image of the original document upon conveyance of the original document by a predetermined length after a timing of detection of the original document by the rear sensor 21.

Further, the rear sensor 21 is used to detect a timing to terminate the image reading operation by the reading unit 17. More specifically, the image reading operation by the reading unit 17 is terminated upon conveyance of the original document by a predetermined length after a timing of non-detection of the original document by the rear sensor 21.

[Electrical Configuration in Image Reading Device 10]

An electrical configuration of the image reading device 10 will be described with reference to FIGS. 2(a) and 2(b). The image reading device 10 includes a CPU 11, a ROM 12, a RAM 13, a flash PROM 14, a device controller 22, an analog front end (AFE) 28, an image processor 23, and the drive circuit 18. These components are connected to an operating portion 15, a display portion 16, the front sensor 20 and the rear sensor 21 through a bus 24.

The ROM 12 is configured to store programs for executing various processes to be performed in the image reading device 10 such as a main reading process and a sub-routine processes in the main reading process. The CPU 11 is configured to control various portions in accordance with the programs read from the ROM 12. The flash PROM 14 is a readable/writable non-volatile memory for storing various data generated through the control process by the CPU 11, such as data of abnormal pixel position computed through the main reading process. The RAM 13 is configured to temporarily store a result of computation generated through the control process by the CPU 11.

FIG. 2(b) is an explanatory diagram describing a dust-position storage area 14a provided in the flash PROM 14. The dust-position storage area 14a serves to store the positions of foreign matter, such as dust, detected on the second platen glass 45. Here, the foreign matter has the potential to generate a defective image. Hereinafter, these detected positions will be called "detected dust positions." In the embodiment, the component of a detected dust position in the sub-scanning direction (hereinafter called the "sub-scanning position") is stored in a sub-scanning-position storage area 14a1, and the component of the detected dust position in the main scanning direction (hereinafter called the "main scanning position") is stored in a main-scanning-position storage area 14a2.

Detected dust positions Q are sequentially stored in the dust-position storage area 14a beginning from the top P of each of the storage areas 14a1 and 14a2, with the sub-scanning positions being stored in the sub-scanning-position storage area 14a1 and the corresponding main scanning positions being stored in the main-scanning-position storage area 14a2. An end identifier R is recorded in each of the storage areas 14a1 and 14a2. The end identifier R indicates that no detected dust positions Q have been recorded posterior to the end identifier R. The end identifier R is set to a value that the detected dust position Q cannot take on. In the embodiment, the end identifier R is 65535. End identifiers R are stored in the tops P of the storage areas 14a1 and 14a2 when the dust-position storage area 14a is in its initialized state. Each time foreign matter having the potential to produce a defective image is detected, the detected dust position Q for the matter is written over the end identifiers R and the end identifiers R are shifted one position rearward.

The device controller 22 is connected to the reading unit 17 and transmits signals to the reading unit 17 for controlling the same on the basis of commands from the CPU 11. Upon receiving a control signal from the device controller 22, the reading unit 17 turns on its light source and transmits, to the AFE 28, analog signals based on the intensity of light received by its light-receiving element (not shown).

The AFE 28 is connected to the reading unit 17 and converts analog signals received from the reading unit 17 to digital data on the basis of commands from the CPU 11. The AFE 28 has a predetermined input range and resolution. For example, the resolution of the AFE 28 may be ten bits for gradations from 0 to 1023. In this case, the AFE 28 converts analog signals received from the reading unit 17 to ten-bit gradation data (values between 0 and 1023) as the digital data. The AFE 28 transmits the digital data resulting from this conversion to the image processor 23.

The image processor 23 is configured of a dedicated image-processing chip called an application-specific integrated circuit (ASIC) and performs various image processes on the digital image data, including image correction such as shading compensation, and a resolution conversion process. The image processor 23 performs shading compensation on the digital image data on the basis of black data BK and white data WH in order to correct gradation values. The image processor 23 also performs a resolution conversion process by thinning out gradation values before outputting the resulting data. The image processor 23 executes the shading compensation process and the resolution conversion process on the basis of parameters set in the image processor 23 itself and stores the digital image data or gradation values in the RAM 13. The white data WH and the black data BK used for the shading compensation are also preset in the image processor 23.

The drive circuit 18 is connected to an ADF motor MT1 and a flatbed motor MT2 and drives the motors MT1 and MT2 on the basis of drive commands received from the CPU 11. Through these driving operations, the drive circuit 18 rotates each of the motors MT1 and MT2 a corresponding angular distance and direction specified in the drive commands. When the ADF motor MT1 is rotated a prescribed amount, the separation roller 50, each of the conveying rollers 53 and 54, and the discharge roller 55 rotates a respective prescribed angular distance to convey an original sheet GS a prescribed distance along the conveying path 57. When the flatbed motor MT2 is rotated a prescribed amount, the reading unit 17 is moved in the sub-scanning direction (the directions indicated by an arrow B or F in FIG. 1).

[Operations of the Image-Reading Device According to the Embodiment]

Figure 3:
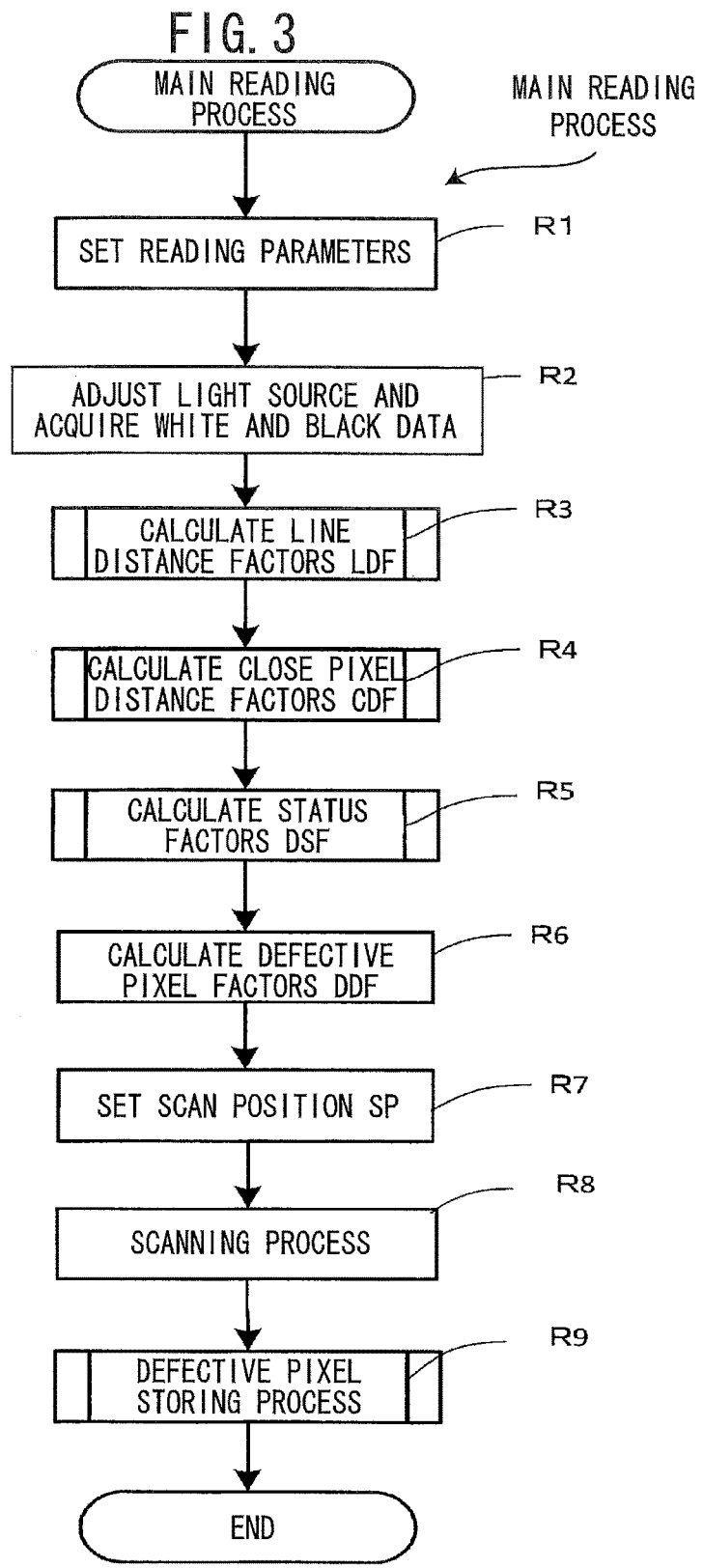
FIG. 3 is a flowchart illustrating a main reading process executed in the embodiment.

Next, the operations of the image-reading device 10 will be described while referring to the accompanying drawings. The image-reading device 10 primarily executes a main reading process for reading original sheets GS. FIG. 3 shows steps R1-R9 in the main reading process. The CPU 11 executes this process, as well as steps in each subroutine of the main reading process.

[Main Reading Process]

The CPU 11 begins the main reading process when the user presses a start button on the operating unit 15 after first placing original sheets GS in the feed tray 58 so that the front sensor 20 enters an ON state. In R1 at the beginning of the main reading process, the CPU 11 sets reading parameters in the device controller 22 and image processor 23. That is, the CPU 11 acquires a reading resolution setting for the reading unit 17 from the flash PROM 14 that corresponds to a reading mode set by the user and sets the acquired reading resolution setting for the device controller 22. The CPU 11 also configures various settings for the image processor 23 indicating that the image processor 23 performs none of various image processes. Additionally, the CPU 11 outputs a command to the drive circuit 18 to move the reading unit 17 to a position confronting the white reference plate 61.

In R2 the CPU 11 adjusts the light source in the reading unit 17 and acquires the white data WH and the black data BK. Specifically, the CPU 11 controls the reading unit 17 to irradiate light from its light source (not shown) toward the white reference plate 61 and adjusts the intensity ST of irradiated light so that the analog signal generated when reading the reflected light is at the maximum point within the input range of the AFE 28. The CPU 11 then controls the reading unit 17 to irradiate light from its light source at this intensity ST and reads the white reference plate 61. In this way, the CPU 11 acquires digital image data for each color component in one scan line as the white data WH. Next, the CPU 11 reads the white reference plate 61 again while the light source is off Through this operation, the CPU 11 acquires digital image data for one scan line as the black data BK.

In R3 the CPU 11 calculates line distance factors LDF. As will be described later in greater detail, the CPU 11 specifically determines whether a defective pixel DP is present in an upstream detection region on the upstream side of each target line TL having no defective pixels DP stored in the dust-position storage area 14a (RA3). The CPU 11 sets an upstream line distance factor L(x) to 0 when a defective pixel DP does not exist and calculates a distance LVS between the target line TL and defective pixel DP when a defective pixel DP does exist (RA5). Here, the variable x indicate a position of the target line in the sub-scanning direction. In the latter case, the CPU 11 calculates the upstream line distance factor L(x) using the distance LVS found above. The same process is repeated for the downstream side of the target line TL to calculate a downstream line distance factor R(x) (RA10). The CPU 11 calculates an upstream line distance factor L(x) and a downstream line distance factor R(x) as the line distance factors LDF for each target line TL in a search region having no defective pixels DP stored in the dust-position storage area 14a. The search region corresponds to an area of the original pressing plate 60. More specifically, the search region is an area where the reading unit 17 faces the original pressing plate 60. A read position is set within the search region. In other words, the search region is the scanning area described above. A detection region is set for both the upstream and downstream sides of the target line TL in the sheet-conveying direction. The upstream detection region is a region adjacent to the target line TL that includes a prescribed number of lines Th located at upstream of the target line TL in the sub-scanning direction F. The downstream detection region is a region adjacent to the target line TL that includes a prescribed number of lines Th located at downstream of the target line TL in the sub-scanning direction F. The number of lines Th is 2, in this embodiment.

In R4 the CPU 11 calculates close pixel distance factors CDF. More specifically, as will be described later in greater detail, the CPU 11 determines whether a defective pixel DP exists in both the upstream detection region and the downstream detection region related to each target line TL having no defective pixels DP stored in the dust-position storage area 14a (RB3, RB5). When such defective pixels DP exist, the CPU 11 calculates a distance K between each defective pixel DP in the upstream region and the corresponding defective pixel DP in the downstream region (RB8). The CPU 11 sets a close pixel distance factor P(x) based on the shortest value Kmin among the distances K calculated above (RB4, RB11, and RB13). The CPU 11 calculates the close pixel distance factor P(x) as the close pixel distance factor CDF for each target line TL in the search region having no defective pixels DP stored in the dust-position storage area 14a.

In R5 the CPU 11 calculates status factors DSF. As will be described later in greater detail, the CPU 11 determines whether a defective pixel DP exists in the detection region on the upstream side of each target line TL having no defective pixels DP stored in the dust-position storage area 14a (RC3). The CPU 11 sets a status factor S(x) to 0 when a defective pixel DP does not exist (RC4). If defective pixels DP exist, the CPU 11 sets the status factor S(x) to 1 when defective pixels DP are present in 10% or more of the pixels in the upstream detection region (RC6) and sets the status factor S(x) to 0 when defective pixels DP are not present in 10% or more of the pixels (RC4). The CPU 11 increments the status factor S(x) by 1 when the defective pixels DP in the upstream detection region are contiguous pixels adjacent in either the main scanning direction or the sub-scanning direction (RC8). The same process is repeated for the downstream side of the target line TL to calculate the status factor S(x). The CPU 11 calculates the status factor S(x) as the status factor DSF for each target line TL in the search region having no defective pixels DP stored in the dust-position storage area 14a.

In R6 the CPU 11 calculates defective pixel factors DDF. Specifically, the CPU 11 sets a defective pixel factor D(x) to the sum of the upstream line distance factor L(x), the downstream line distance factor R(x), the close pixel distance factor P(x), and the status factor S(x). The CPU 11 calculates the defective pixel factors D(x) as the defective pixel factor DDF for each target line TL in the search region having no defective pixels DP stored in the dust-position storage area 14a.

In R7 the CPU 11 sets a scan position SP. Specifically, the CPU 11 sets the scan position SP to the sub-scanning position in the detection region having the smallest defective pixel factor DDF. When there is a plurality of sub-scanning positions with the smallest defective pixel factor DDF, the CPU 11 sets the scan position SP to the sub-scanning position nearest the white reference plate 61, i.e., on the most upstream side in the sub-scanning position (the direction of arrow B).

In R8 the CPU 11 executes a scanning process. Specifically, the CPU 11 configures settings for the image processor 23 to execute various image processes. Next, the CPU 11 moves the reading unit 17 to the scan position SP and controls the drive circuit 18 to convey an original sheet GS. The CPU 11 reads the original sheet GS conveyed by the drive circuit 18. Finally, the CPU 11 sequentially executes a shading compensation process based on the white data WH and the black data BK acquired in R2, various correction processes, and a resolution conversion process to generate gradation values.

In R9 the CPU 11 executes a defective pixel storing process. More specifically, as will be described later, the CPU 11 reads one line worth of gradation values (RD1). The CPU 11 sequentially selects a target pixel TP from the first pixel to the end pixel in the read line and determines whether the target pixel TP has a gradation value smaller than a threshold value. When the target pixel TP has the gradation value smaller than the threshold value (RD3: NO), the CPU 11 stores the position of the pixel in the dust-position storage area 14a (RD4). After completing the defective pixel storing process of R9, the CPU 11 ends the main reading process.

[Process for Calculating the Line Distance Factors LDF]

FIG. 4 shows steps in the process for calculating the line distance factors LDF of R3. In RA1 at the beginning of this process, the CPU 11 sets the target line TL. Here, the line includes pixels arranged in the main scanning directions. The plurality of lines arranged in the sub-scanning direction within the search region and each line extends in the main scanning direction. Here, the CPU 11 sets the target line TL to the next line following the currently set target line TL. When the currently set target line TL is an end line EL, the target line TL is set to the first line FL.

In RA2 the CPU 11 determines whether a defective pixel DP is present in the target line TL. When a defective pixel DP exists (RA2: YES), the CPU 11 advances to the process in RA11 described later for determining whether the target line TL is the end line EL. When a defective pixel DP is not present in the target line TL (RA2: NO), the CPU 11 advances to the process in RA3 for determining whether a defective pixel DP is present in the upstream detection region.

In RA3 the CPU 11 determines whether a defective pixel DP is present in the upstream detection region. If a defective pixel DP does not exist in the upstream detection region (RA3: NO), in RA4 the CPU 11 sets the upstream line distance factor L(x) to 0. However, if a defective pixel DP does exist in the upstream detection region (RA3: YES), the CPU 11 executes the process in RA5 for calculating the distance LVS between the target line TL and the upstream defective pixel DP. After completing the process in RA4, the CPU 11 performs the process in RA7 for determining whether a defective pixel DP exists in the downstream detection region. Here, "upstream" indicates the upstream side of the target line TL in the sub-scanning direction, i.e., the direction in which the original is conveyed. Conversely, "downstream" indicates the downstream side of the target line TL in the sub-scanning direction.

In RA5 the CPU 11 calculates the distance LVS between the target line TL and the upstream defective pixel DP. Specifically, the CPU 11 finds the defective pixel DP among all upstream defective pixels DP that is nearest the target line TL. The CPU 11 sets the distance LVS to the difference between the sub-scanning position of the defective pixel DP retrieved above and the sub-scanning position of the target line TL.

In RA6 the CPU 11 calculates the upstream line distance factor L(x). Specifically, the CPU 11 subtracts the distance LVS calculated in RA5 from the number of lines Th present in the upstream detection region, adds 1 to this difference, and sets upstream line distance factor L(x) to the result. Here, the "1" added at the end is a value determined in relation to the number of lines Th and may be set to a larger value when it is desirable for the upstream line distance factor to have greater influence on the defective pixel factor DDF.

In RA7 the CPU 11 determines whether a defective pixel DP is present in the downstream detection region. When a defective pixel DP is not present in the downstream detection region (RA7: NO), in RA8 the CPU 11 sets the downstream line distance factor R(x) to 0. However, if a defective pixel DP is present in the downstream detection region (RA7: YES), the CPU 11 executes the process in RA9 for calculating a distance RVS between the target line TL and the downstream defective pixel DP. After completing the process in RA8, the CPU 11 advances to the process in RA11 for determining whether the target line TL is the end line EL.

In RA9 the CPU 11 calculates the distance RVS between the target line TL and the downstream defective pixel DP. More specifically, the CPU 11 finds the defective pixel DP among all downstream defective pixels DP that is nearest the target line TL. The CPU 11 sets the distance RVS to the difference between the sub-scanning position of the defective pixel DP found above and the sub-scanning position of the target line TL.

In RA10 the CPU 11 calculates the downstream line distance factor R(x). That is, the CPU 11 subtracts the distance RVS calculated in RA9 from the number of lines Th constituting the downstream detection region, adds 1 to the difference, and sets the downstream line distance factor R(x) to the result. Here, the "1" added at the end is a value determined in relation to the number of lines Th and is set to a larger value when it is desirable for the downstream line distance factor to have greater influence on the defective pixel factor DDF.

In RA11 the CPU 11 determines whether the target line TL is the end line EL. If the target line TL is not the end line EL (RA11: NO), the CPU 11 returns to the process in RA1 for setting the next target line TL. When the target line TL is the end line EL (RA11: YES), the CPU 11 ends the process for calculating the line distance factors LDF.

[Process for Calculating the Close Pixel Distance Factors CDF]

FIG. 5 shows steps in the process for calculating the close pixel distance factors CDF of R4. In RB1 at the beginning of this process, the CPU 11 sets the target line TL as described in RA1. That is, the CPU 11 sets the target line TL to the next line following the currently set target line TL. If the currently set target line TL is the end line EL, the CPU 11 sets the target line TL to the first line FL.

In RB2 the CPU 11 determines whether a defective pixel DP exists in the target line TL. If a defective pixel DP exists in the target line TL (RB2: YES), the CPU 11 performs the process in RB14 described later for determining whether the target line TL is the end line EL. However, if a defective pixel DP does not exist in the target line TL (RB2: NO), the CPU 11 advances to RB3 to determine whether a defective pixel DP exists in the upstream detection region.

In RB3 the CPU 11 determines whether a defective pixel DP is present in the upstream detection region. When a defective pixel DP does not exist in the upstream detection region (RB3: NO), in RB4 the CPU 11 sets the close pixel distance factor P(x) to 0. However, if a defective pixel DP does exist in the upstream detection region (RB3: YES), the CPU 11 advances to the process in RB5 for determining whether a defective pixel DP exists in the downstream detection region. After completing the process in RB4, the CPU 11 advances to the process in RB14 for determining whether the target line TL is the end line EL.

In RB5 the CPU 11 determines whether a defective pixel DP is present in the downstream detection region. If a defective pixel DP is not present in the downstream detection region (RB5: NO), in RB4 the CPU 11 sets the close pixel distance factor P(x) to 0. However, if a defective pixel DP is present in the downstream detection region, the CPU 11 advances to the process in RB6 for setting an upstream target defective pixel. Upon completing the process in RB4, the CPU 11 advances to the process in RB14 for determining whether the target line TL is the end line EL.

In RB6 the CPU 11 sets a target defective pixel TDP to the defective pixel DP in the upstream detection region. More specifically, the CPU 11 sets the target defective pixel TDP to each of the defective pixels DP present in the upstream detection region in a sequence beginning from the defective pixel DP nearest the target line TL and nearest the first pixel that is a most upstream pixel in the main scanning direction. In the embodiment, an end defective pixel DP in this sequence is referred to as an end defective pixel EDP.

In RB7 the CPU 11 finds a proximate downstream defective pixel DDP in the downstream detection region that is a defective pixel in the downstream detection region nearest the target defective pixel TDP. More specifically, the CPU 11 retrieves defective pixels DP in the downstream detection region from the defective pixels DP stored in the dust-position storage area 14*a*. The CPU 11 finds the defective pixel DP among the defective pixels DP retrieved from the dust-position storage area 14*a* having a main scanning position closest to the main scanning position of the target defective pixel TDP. When there are multiple defective pixels DP having the closest main scanning position, the CPU 11 finds the defective pixel DP that is closest to the target line TL. The CPU 11 stores the closest defective pixel DP found above in the RAM 13 as the proximate downstream defective pixel DDP.

In RB8 the CPU 11 calculates the distance K between the target defective pixel TDP and the proximate downstream defective pixel DDP. That is, the CPU 11 calculates the difference between the pixel position of the target defective pixel TDP in the main scanning direction and the pixel position of the proximate downstream defective pixel DDP in the main scanning direction as a main-scan pixel difference. Similarly, the CPU 11 calculates the difference between the pixel position of the target defective pixel TDP in the sub-scanning direction and the pixel position of the proximate downstream defective pixel DDP in the sub-scanning direction as a sub-scan pixel difference. The CPU 11 then calculates the distance K between the target defective pixel TDP and proximate downstream defective pixel DDP. Specifically, the CPU 11 calculates a sum of the square of the main-scan pixel difference and the square of the sub-scan pixel difference found above, and sets the distance K to the square root of the sum. Alternatively, the CPU 11 may calculate the root mean square of the main-scan pixel difference and the sub-scan pixel difference.

In RB9 the CPU 11 determines whether the target defective pixel TDP is an end defective pixel EDP among all defective pixels DP present in the upstream detection region. If the target defective pixel TDP is not the end defective pixel EDP (RB9: NO), the CPU 11 returns to the process in RB6 for newly setting the upstream target defective pixel DP according to the sequence described above. However, when the target defective pixel TDP is the end defective pixel EDP (RB9: YES), the CPU 11 advances to the process in RB10 for determining whether the smallest value Kmin of distances K is smaller than or equal to 3.

In RB10 the CPU 11 determines whether the smallest value Kmin of distances K is smaller than or equal to 3. If the smallest value Kmin of distances K is less than or equal to 3 (RB10: YES), in RB11 the CPU 11 sets the close pixel distance factor P(x) to 3. However, if the smallest value Kmin of distances K is greater than 3 (RB10: NO), the CPU 11 advances to the process in RB12 for determining whether the smallest value Kmin of distances K is greater than 3 but smaller than or equal to 5. After completing the process in RB11, the CPU 11 advances to the process in RB14 for determining whether the target line TL is the end line EL.

In RB12 the CPU 11 determines whether the smallest value Kmin of distances K is greater than 3 but smaller than or equal to 5. If the smallest value Kmin is greater than 3 but smaller than or equal to 5 (RB12: YES), in RB13 the CPU 11 sets the close pixel distance factor P(x) to 1. However, if the smallest value Kmin is greater than 5 (RB12: NO), the CPU 11 advances to the process in RB4 for setting the close pixel distance factor P(x) to 0. After completing the process in RB13 or RB4, the CPU 11 advances to the process in RB14 for determining whether the target line TL is the end line EL.

In RB14 the CPU 11 determines whether the target line TL is the end line EL. If the target line TL is not the end line EL (RB14: NO), the CPU 11 returns to the process in RB1 for setting the next target line TL. When the target line TL is the end line EL (RB14: YES), the CPU 11 ends the process for calculating the close pixel distance factors CDF.

[Process for Calculating the Status Factors DSF]

FIG. 6 shows steps in the process for calculating the status factors DSF of R5. In RC1 at the beginning of this process, the CPU 11 sets the target line TL as described above in processes RA1 and RB1. That is, the CPU 11 sets the target line TL to the next line following the currently set target line TL. When the currently set target line TL is the end line EL, the CPU 11 sets the target line TL to the first line FL.

In RC2 the CPU 11 determines whether a defective pixel DP is present in the target line TL. If a defective pixel DP is present in the target line TL (RC2: YES), the CPU 11 advances to the process in RC14 for determining whether the target line TL is the end line EL. However, if a defective pixel DP does not exist in the target line TL (RC2: NO), the CPU 11 advances to the process in RC3 for determining whether a defective pixel DP is present in the upstream detection region.

In RC3 the CPU 11 determines whether a defective pixel DP is present in the upstream detection region. If a defective pixel DP is not present in the upstream detection region (RC3: NO), in RC4 the CPU 11 sets the status factor S(x) to 0. However, if a defective pixel DP is present in the upstream detection region (RC3: YES), the CPU 11 advances to the process in RC5 for determining whether the number of defective pixels in the upstream detection region (hereinafter called the "upstream defective pixel number UDPN") is greater than or equal to 10% of the total number of pixels in the upstream detection region. After completing the process in RC4, the CPU 11 advances to the process in RC7 for determining whether the defective pixels in the upstream detection region are contiguous.

In RC5 the CPU 11 determines whether the upstream defective pixel number UDPN is greater than or equal to 10% of the total number of pixels in the upstream detection region. The CPU 11 sets the status factor S(x) to 0 in RC4 when the upstream defective pixel number UDPN is less than 10% (RC5: NO) and sets the status factor S(x) to 1 in RC6 when the upstream defective pixel number UDPN is greater than or equal to 10% (RC5: YES). After completing either process in RC4 or RC6, the CPU 11 advances to the process in RC7 for determining whether the defective pixels in the upstream detection region are contiguous.

In RC7 the CPU 11 determines whether defective pixels in the upstream detection region are contiguous. Specifically, the CPU 11 determines whether there are defective pixels DP in the upstream detection region among the pixels stored in the dust-position storage area 14*a* that are adjacent to each other in the sub-scanning direction or the main scanning direction. If the CPU 11 determines that there are contiguous defective pixels (RC7: YES), in RC8 the CPU 11 increments the status factor S(x) by 1. However, if none of the defective pixels stored in the dust-position storage area 14*a* are contiguous (RC7: NO), the CPU 11 advances to the process in RC9 for determining whether any defective pixels DP are present in the downstream detection region. The CPU 11 also advances to the process in RC9 after completing the process in RC8.

In RC9 the CPU 11 determines whether there are defective pixels DP present in the downstream detection region. If a defective pixel DP is not present in the downstream detection region (RC9: NO), the CPU 11 advances to the process in RC14 for determining whether the target line TL is the end line EL. However, if defective pixels DP are present in the downstream detection region (RC9: YES), the CPU 11 advances to the process in RC10 for determining whether the number of defective pixels in the downstream detection region (hereinafter called the "downstream defective pixel number DDPN") is greater than or equal to 10% of the total number of pixels in the downstream detection region.

In RC10 the CPU 11 determines whether the downstream defective pixel number DDPN is greater than or equal to 10% of the total number of pixels in the downstream detection region. If the downstream defective pixel number DDPN is smaller than 10% of the total number of pixels (RC10: NO), the CPU 11 advances to the process in RC12 for determining whether there exist defective pixels in the downstream detection region that are contiguous. If the downstream defective pixel number DDPN is greater than or equal to 10% of the total number of pixels in the downstream detection region (RC10: YES), in RC11 the CPU 11 increments the status factor S(x) by 1. After completing the process in RC11, the CPU 11 advances to RC12 for determining whether any defective pixels in the downstream detection region are contiguous.

In RC12 the CPU 11 determines whether there are contiguous defective pixels in the downstream detection region. Specifically, the CPU 11 determines whether there are defective pixels DP in the downstream detection region among the pixels stored in the dust-position storage area 14a that are adjacent to each other in the sub-scanning direction or in the main scanning direction. If there are defective pixels DP in the downstream detection region that are contiguous (RC12: YES), in RC13 the CPU 11 increments the status factor S(x) by 1. However, if there are no contiguous defective pixels DP (RC12: NO), the CPU 11 advances to the process in RC14 for determining whether the target line TL is the end line EL. The CPU 11 also advances to the process in RC14 after completing the process in RC13.

In RC14 the CPU 11 determines whether the target line TL is the end line EL. If the target line TL is not the end line EL (RC14: NO), the CPU 11 advances to the process in RC1 for setting the next target line TL. If the target line TL is the end line EL (RC14: YES), the CPU 11 ends the process for calculating the status factors DSF.

[Process for Storing Defective Pixel Positions]

FIG. 7 shows steps in the process for storing defective pixel positions. In RD1 at the beginning of this process, the CPU 11 turns on the light source of the reading unit 17 at the intensity ST, controls the reading unit 17 to scan the original-pressing plate 60, and acquires one line worth of gradation values.

In RD2 the CPU 11 sets a target pixel TP. More specifically, the CPU 11 sets the target pixel TP to the next pixel following the currently set target pixel TP according to an order along one line whose gradation values are acquired, for example. If the currently set target pixel TP is the end pixel, the CPU 11 sets the target pixel TP to the first pixel FP.

In RD3 the CPU 11 determines whether the gradation value is greater than a threshold value. More specifically, the CPU 11 determines whether the gradation value of the target pixel TP acquired in the process of RD1 is greater than a threshold value. If the gradation value is greater than the threshold value (RD3: YES), the CPU 11 advances to the process in RD5 for determining whether the target pixel TP is the end pixel EP. However, if the gradation value is smaller than or equal to the threshold value (RD3: NO), the CPU 11 advances to the process in RD4 for storing the position of the defective pixel. Here, the threshold value is set to 51, for example, which is 5% of the range of gradation values (0-1023 in the embodiment).

In RD4 the CPU 11 stores the pixel position of the target pixel TP in the dust-position storage area 14a as a defective pixel position. More specifically, the CPU 11 stores the main scanning component of the target pixel TP in the main-scanning-position storage area 14a2 and the sub-scanning component of the scan position SP in the sub-scanning-position storage area 14a1.

In RD5 the CPU 11 determines whether the target pixel TP is the end pixel EP. When the target pixel TP is not the end pixel EP (RD5: NO), the CPU 11 returns to the process in RD2 for setting the next target pixel TP. When the target pixel TP is the end pixel EP (RD5: YES), the CPU 11 ends the process for storing defective pixel positions.

[Specific Example]

Next, a specific example for setting the scan position SP will be described with reference to FIGS. 8(a)-8(c). FIG. 8(a) is a simple conceptual diagram illustrating this example. FIG. 8(b) shows the data stored in the dust-position storage area 14a. FIG. 8(c) shows calculated factors LDF, CDF, and DSF for the example shown in FIG. 8(a). To simplify the description, this example will cover a scanning area having only ten pixels in the main scanning direction and sixteen lines in the sub-scanning direction. The first line will be called "line 0," while the end line will be called "line 15." This example describes the process of setting the scan position SP when five defective pixels are present in the scanning area. The defective pixels in this example are the filled cells in FIG. 8(a). The numerical values for these pixel positions are stored as detected dust positions Q in FIG. 8(b). The number of lines Th indicating the range of the detection region in this example has been set to 2.

The process for calculating the line distance factor LDF for this example will be described. In this description, the target line TL is first set to line 0. Since a defective pixel DP is not present in the upstream detection region (i.e., since there are no lines upstream of line 0; RA3: NO), the CPU 11 sets the upstream line distance factor L(0) to 0. However, since a defective pixel DP exists in the downstream detection region (RA7: YES), the CPU 11 calculates the difference between the target line TL (line 0) and the line containing the nearest defective pixel DP (line 1) as the distance RVS. Hence, the CPU 11 sets the distance RVS to 1. Further, in RA10 the CPU 11 calculates the downstream line distance factor R(0) to be 2 by subtracting the distance RVS (1) from the number of lines Th (2) and adding 1 to the result. Since the target line TL (line 0) is not the end line EL (line 15; RA11: NO), the CPU 11 returns to RA1. At this time, the target line TL is set to line 1 and the process is repeated. Since a defective pixel DP exists in the target line 1 (RA2: YES), the CPU 11 advances to the process in RA11. Since the target line TL (line 1) is not the end line EL (line 15; RA11: NO), the CPU 11 returns to RA1.

A process will be described in a case where the target line TL is set to line 2. Since a defective pixel DP exists in line 1, which is in the upstream detection region (RA3: YES), the CPU 11 calculates the distance LVS between the target line TL (line 2) and the upstream defective pixel DP (line 1) to be 1. Next, the CPU 11 calculates the upstream line distance factor L(2) to be 2 by subtracting the distance LVS (1) from the number of lines Th (2) and adding 1 to the result. Further, since a defective pixel DP exists in line 4 of the downstream detection region (RA7: YES), the CPU 11 calculates the distance RVS between the target line TL (line 2) and the downstream defective pixel DP (line 4) to be 2. Next, the CPU 11 calculates the downstream line distance factor R(2)

to be 1 by subtracting the distance RVS (2) from the number of lines Th (2) and adding 1 to the result. Since the target line TL (line 2) is not the end line EL (line 15; RA11: NO), the CPU 11 returns to RA1.

Next, a process will be described in a case where the target line TL is set to line 3. Since a defective pixel DP exists in line 1, which is in the upstream detection region (RA3: YES), the CPU 11 calculates the distance LVS between the target line TL (line 3) and the upstream defective pixel DP (line 1) to be 2. The CPU 11 calculates the upstream line distance factor L(3) to be 1 by subtracting the distance LVS (2) from the number of lines Th (2) and adding 1 to the result. Further, since a defective pixel DP exists in line 4 of the downstream detection region (RA7: YES), the CPU 11 calculates the distance RVS between the target line TL (line 3) and the downstream defective pixel DP (line 4) to be 1. The CPU 11 calculates the downstream line distance factor R(3) to be 2 by subtracting the distance RVS (1) from the number of lines Th (2) and adding 1 to the result. Since the target line TL (line 3) is not the end line EL (line 15; RA11: NO), the CPU 11 returns to RA1. Next, a process will be described in a case where the target line TL is set to line 4. Since a defective pixel DP exists (RA2: YES), the routine proceeds into RA11. Since the target line TL (line 4) is not the end line EL (line 15; RA11: NO), the CPU 11 returns to RA1.

When the target line TL is set to line 5, since a defective pixel DP exists in line 4, which is in the upstream detection region (RA3: YES), the CPU 11 calculates the distance LVS between the target line TL (line 5) and the upstream defective pixel DP (line 4) to be 1. Next, the CPU 11 calculates the upstream line distance factor L(5) to be 2 by subtracting the distance LVS (1) from the number of lines Th (2) and adding 1 to the result. Further, since a defective pixel DP exists in line 6 of the downstream detection region (RA7: YES), the CPU 11 calculates the distance RVS between the target line TL (line 5) and the downstream defective pixel DP (line 6) to be 1. The CPU 11 calculates the downstream line distance factor R(5) to be 2 by subtracting the distance RVS (1) from the number of lines Th (2) and adding 1 to the result. Since the target line TL (line 5) is not the end line EL (line 15; RA11: NO), the CPU 11 returns to RA1. Next, a process will be described in a case where the target line TL is set to line 6. Since a defective pixel DP exists (RA2: YES), the routine proceeds into RA11. Since the target line TL (line 6) is not the end line EL (line 15; RA11: NO), the CPU 11 returns to RA1.

Next, a process will be described in a case where the target line TL is set to line 7. Since a defective pixel DP exists in line 6, which is in the upstream detection region (RA3: YES), the CPU 11 calculates the distance LVS between the target line TL (line 7) and the upstream defective pixel DP (line 6) to be 1. The CPU 11 calculates the upstream line distance factor L(7) to be 2 by subtracting the distance LVS (1) from the number of lines Th (2) and adding 1 to the result. Further, since a defective pixel DP does not exist in the downstream detection region (RA7: NO), the downstream line distance factor R(7) is set to zero. Since the target line TL (line 7) is not the end line EL (line 15; RA11: NO), the CPU 11 returns to RA1.

Next, a process will be described in a case where the target line TL is set to line 8. Since a defective pixel DP exists in line 6 which is in the upstream detection region (RA3: YES), the CPU 11 calculates the distance LVS between the target line TL (line 8) and the upstream defective pixel DP (line 6) to be 2. The CPU 11 calculates the upstream line distance factor L(8) to be 1 by subtracting the distance LVS (2) from the number of lines Th (2) and adding 1 to the result. Further, since a defective pixel DP exists in line 10 of the downstream detection region (RA7: YES), the CPU 11 calculates the distance RVS between the target line TL (line 8) and the downstream defective pixel DP (line 10) to be 2. Next, the CPU 11 calculates the downstream line distance factor R(8) to be 1 by subtracting the distance RVS (2) from the number of lines Th (2) and adding 1 to the result. Since the target line TL (line 8) is not the end line EL (line 15; RA11: NO), the CPU 11 returns to RA1.

Next, a process will be described in a case where the target line TL is set to line 9. Since a defective pixel DP does not exist in the upstream detection region (RA3: NO), the upstream line distance factor L(9) is set to 0. Since a defective pixel DP exists in line 10 which is in downstream detection region (RA7: YES), the CPU 11 calculates the distance RVS between the target line TL (line 9) and the downstream defective pixel DP (line 10) to be 1. The CPU 11 calculates the downstream line distance factor R(9) to be 2 by subtracting the distance RVS (2) from the number of lines Th (2) and adding 1 to the result. Since the target line TL (line 9) is not the end line EL (line 15; RA11: NO), the CPU 11 returns to RA1. Next, a process will be described in a case where the target line TL is set to line 10. Since a defective pixel DP exists (RA2: YES), the routine proceeds into RA11. Since the target line TL (line 10) is not the end line EL (line 15; RA11: NO), the CPU 11 returns to RA1.

Next, a process will be described in a case where the target line TL is set to line 11. Since a defective pixel DP exists in line 10 which is in upstream detection region (RA3: YES), the CPU 11 calculates the distance LVS between the target line TL (line 11) and the defective pixel DP (line 10) to be 1. The CPU 11 calculates the upstream line distance factor L(11) to be 2 by subtracting the distance LVS (1) from the number of lines Th (2) and adding 1 to the result. Since a defective pixel DP does not exist in downstream detection region (RA7: NO), the downstream line distance factor R(11) is set to 0. Since the target line TL (line 11) is not the end line EL (line 15; RA11: NO), the CPU 11 returns to RA1.

Next, a process will be described in a case where the target line TL is set to line 12. Since a defective pixel DP exists in line 10 which is in upstream detection region (RA3: YES), the CPU 11 calculates the distance LVS between the target line TL (line 12) and the defective pixel DP (line 10) to be 2. The CPU 11 calculates the upstream line distance factor L(12) to be 1 by subtracting the distance LVS (2) from the number of lines Th (2) and adding 1 to the result. Since a defective pixel DP does not exist in downstream detection region (RA7: NO), the downstream line distance factor R(12) is set to 0. Since the target line TL (line 12) is not the end line EL (line 15; RA11: NO), the CPU 11 returns to RA1.

Next, a process will be described in a case where the target line TL is set to line 13. Since a defective pixel DP does not exist in the upstream detection region (RA3: NO), the upstream line distance factor L(13) is set to 0. Since a defective pixel DP does not exist in downstream detection region (RA7: NO), the downstream line distance factor R(13) is set to 0. Since the target line TL (line 13) is not the end line EL (line 15; RA11: NO), the CPU 11 returns to RA1. Since a defective pixel DP does not exist in the detection region in a case where the target line TL is set to line 14 and line 15, upstream line distance factors L(14) and L(15) and downstream line distance factors R(14) and R(15) are set to 0.

Next, the process for calculating the close pixel distance factor CDF will be described for the above example. First, this process will be described for the case in which the target line TL is set to line 0. Since a defective pixel DP is not present in the upstream detection region (RB3: NO), the CPU 11 sets the close pixel distance factor P(0) to 0. At this time, the target line TL (line 0) is not the end line EL (line 15; RB14: NO), and the CPU 11 returns to the process in RB1. Next, the target line TL is set to line 1, and the process is repeated. Since a defective pixel DP exists in the upstream detection region (RB2: YES), the CPU 11 advances to RB14 and subsequently returns to RB1 because the target line TL (line 1) is not the end line EL (line 15; RB14: NO).

Next, the target line TL is set to line 2 and the process is repeated. Since a defective pixel DP exists in both the upstream detection region and the downstream detection region (RB3: YES, RB5: YES), the CPU 11 sets the pixel having pixel position (1, 2) as the upstream target defective pixel TDP. Here, pixel position (1, 2) denotes the position of line 1 relative to the sub-scanning direction and pixel 2 relative to the main scanning direction. Subsequently, the CPU 11 retrieves the pixel having pixel position (4, 4) as the proximate downstream defective pixel DDP in the downstream detection region nearest the pixel at pixel position (1, 2). The CPU 11 calculates the distance K between pixel position (1, 2) and pixel position (4, 4) to be 3.6. Since the pixel at pixel position (1, 2) is the end defective pixel EDP (RB9: YES), the smallest value Kmin among all distances K is 3.6. Since the smallest value Kmin of the distances K is greater than or equal to 3 and less than 5 (RB12: YES), the CPU 11 sets the close pixel distance factor P(2) to 1.

Next, a process will be described for a case in which the target line TL is set to line 3. Since a defective pixel DP exists in both the upstream detection region and the downstream detection region (RB3: YES, RB5: YES), the CPU 11 sets the pixel having pixel position (1, 2) as the upstream target defective pixel TDP. Subsequently, the CPU 11 retrieves the pixel having pixel position (4, 4) as the proximate downstream defective pixel DDP in the downstream detection region nearest the pixel at pixel position (1, 2). The CPU 11 calculates the distance K between pixel position (1, 2) and pixel position (4, 4) to be 3.6. Since the pixel at pixel position (1, 2) is the end defective pixel EDP (RB9: YES), the smallest value Kmin among all distances K is 3.6. Since the smallest value Kmin of the distances K is greater than or equal to 3 and less than 5 (RB12: YES), the CPU 11 sets the close pixel distance factor P(3) to 1. Next, when the target line TL is set to line 4, the routine proceeds into process RB14. Since the target line TL (line 4) is not the end line EL (line 15; RB14: NO), the CPU 11 returns to RB1.

Next, a process will be described for a case in which the target line TL is set to line 5. Since a defective pixel DP exists in both the upstream detection region and the downstream detection region (RB3: YES, RB5: YES), the CPU 11 sets the pixel having pixel position (4, 4) as the upstream target defective pixel TDP. Subsequently, the CPU 11 retrieves the pixel having pixel position (6, 5) as the proximate downstream defective pixel DDP in the downstream detection region nearest the pixel at pixel position (4, 4). The CPU 11 calculates the distance K between pixel position (4, 4) and pixel position (6, 5) to be 2.2. Since the pixel at pixel position (4, 4) is not the end defective pixel EDP (RB9: NO), the pixel having the pixel position (4, 5) is set as the next upstream target defective pixel TDP. Subsequently, the CPU 11 retrieves the pixel having pixel position (6, 5) as the proximate downstream defective pixel DDP in the downstream detection region nearest the pixel at pixel position (4, 5). The CPU 11 calculates the distance K between pixel position (4, 5) and pixel position (6, 5) to be 2. Since the pixel at pixel position (4, 5) is the end defective pixel EDP (RB9: YES), the smallest value Kmin of the distances K is 2. Since the smallest value Kmin among all distances K is smaller than or equal to 3, (RB10: YES), the CPU 11 sets the close pixel distance factor P(5) to 3. Next, when the target line TL is set to line 6, the routine proceeds into process RB14, since defective pixel DP exists (RB2: YES). Since the target line TL (line 6) is not the end line EL (line 15; RB14: NO), the CPU 11 returns to RB1.

Next, a process will be described for a case in which the target line TL is set to line 7. Since a defective pixel DP does not exists in the downstream detection region (RB5: NO), the close pixel distance factor P(7) is set to 0. Since the target line TL (line 7) is not the end line EL (line 15; RB14: NO), the CPU 11 returns to RB1.

Next, a process will be described for a case in which the target line TL is set to line 8. Since a defective pixel DP exists in both the upstream detection region and the downstream detection region (RB3: YES, RB5: YES), the CPU 11 sets the pixel having pixel position (6, 5) as the upstream target defective pixel TDP. Subsequently, the CPU 11 retrieves the pixel having pixel position (10, 7) as the proximate downstream defective pixel DDP in the downstream detection region nearest the pixel at pixel position (6, 5). The CPU 11 calculates the distance K between pixel position (6, 5) and pixel position (10, 7) to be 4.5. Since the pixel at pixel position (6, 5) is the end defective pixel EDP (RB9: YES), the smallest value Kmin of the distances K is 4.5. Since the smallest value Kmin among all distances K is greater than or equal to 3 and less than 5, (RB12: YES), the CPU 11 sets the close pixel distance factor P(8) to 1.

Next, a process will be described for a case in which the target line TL is set to line 9. Since a defective pixel DP is not present in the upstream detection region (RB5: NO), the CPU 11 sets the close pixel distance factor P(9) to 0. Since the target line TL (line 9) is not the end line EL (line 15; RB14: NO), the CPU 11 returns to RB1. Next, a process will be described for a case in which the target line TL is set to line 10. Since a defective pixel DP is present (RB2: YES), the CPU 11 proceeds to the process RB14. Since the target line TL (line 10) is not the end line EL (line 15; RB14: NO), the CPU 11 returns to RB1.

Next, a process will be described for a case in which the target line TL is set to line 11. Since a defective pixel DP is not present in the downstream detection region (RB5: NO), the CPU 11 sets the close pixel distance factor P(11) to 0. Since the target line TL (line 11) is not the end line EL (line 15; RB14: NO), the CPU 11 returns to RB1. The same is true with respect to lines 12, 13, 14 and 15. Since a defective pixel DP is not present in the downstream detection region, the CPU 11 sets the close pixel distance factors P(12), P(13), P(14), P(15) to 0.

Next, a process for calculating status factors DSF will be described. First, a process will be described for a case where the target line TL is set to 0. Since a defective pixel DP is not present in the upstream detection region (RC3: NO, RC7: NO), the CPU 11 sets the status factor S(0) to 0. Since a defective pixel DP is present in the downstream detection region (RC9: YES), the CPU 11 proceeds into RC10. Numbers of defective pixel DDPN in the downstream detection region is 1, which is less than 10% of numbers of 20 which is the total numbers of pixels in the downstream detection region (RC10: NO). Further, pixels in the downstream detection region are not continuous with each other (RC12: NO). Thus, the status factors S(0) remains unchanged to 0. Next, a process will be described for a case where the target line TL is set to 1. Since a defective pixel DP is present (RC2: YES), the CPU 11 proceeds into RC14. Since the target line (1 line) is not the end line EL (line 15) (RC14: NO), the CPU 11 returns to RC1.

Next, a process will be described for a case where the target line TL is set to 2. Since a defective pixel DP is present in the upstream detection region (RC3: YES), the CPU 11 proceeds into RC5. Numbers of defective pixel UDPN in the upstream detection region is 1, which is less than 10% of numbers of 20 which is the total numbers of pixels in the upstream detection region (RC5: NO). Further, pixels in the upstream detection region are not continuous with each other (RC7: NO). Thus, the status factors S(2) is set to 0. Since a defective pixel DP is present in the downstream detection region (RC9: YES), the CPU 11 proceeds into RC10. Numbers of defective pixel DDPN in the downstream detection region is 2, which is greater than or equal to 10% of numbers of 20 which is the total numbers of pixels in the downstream detection region (RC10: YES). Thus, the status factor S(2) is set to 1 by adding 1. Further, pixels in the downstream detection region are continuous with each other (RC12: YES). Thus, the status factors S(2) is set to 2 by adding 1. Since the target line TL(2) is not the end line EL (line 15) (RC14: NO), the CPU 11 returns to RC1.

Next, a process will be described for a case where the target line TL is set to 3. Since a defective pixel DP is present in the upstream detection region (RC3: YES), the CPU 11 proceeds into RC5. Numbers of defective pixel UDPN in the upstream detection region is 1, which is less than 10% of numbers of 20 which is the total numbers of pixels in the upstream detection region (RC5: NO). Further, pixels in the upstream detection region are not continuous with each other (RC7: NO). Thus, the status factors S(3) is set to 0. Since a defective pixel DP is present in the downstream detection region (RC9: YES), the CPU 11 proceeds into RC10. Numbers of defective pixel DDPN in the downstream detection region is 2, which is greater than or equal to 10% of numbers of 20 which is the total numbers of pixels in the downstream detection region (RC10: YES). Thus, the status factor S(3) is set to 1 by adding 1. Further, pixels in the downstream detection region are continuous with each other (RC12: YES). Thus, the status factors S(3) is set to 2 by adding 1. Since the target line TL(3) is not the end line EL (line 15) (RC14: NO), the CPU 11 returns to RC1. Next, a process will be described for a case where the target line TL is set to 4. Since a defective pixel DP is present (RC2: YES), the CPU 11 proceeds into RC14. Since the target line (4 line) is not the end line EL (line 15) (RC14: NO), the CPU 11 returns to RC1.

Next, a process will be described for a case where the target line TL is set to 5. Since a defective pixel DP is present in the upstream detection region (RC3: YES), the CPU 11 proceeds into RC5. Numbers of defective pixel UDPN in the upstream detection region is 2, which is greater than or equal to 10% of numbers of 20 which is the total numbers of pixels in the upstream detection region (RC5: NO). Thus, the status factors S(5) is set to 1. Further, pixels in the upstream detection region are continuous with each other (RC7: YES). Thus, the status factors S(5) is set to 2 by adding 1. Since a defective pixel DP is present in the downstream detection region (RC9: YES), the CPU 11 proceeds into RC10. Numbers of defective pixel DDPN in the downstream detection region is 1, which is less than 10% of numbers of 20 which is the total numbers of pixels in the downstream detection region. Further, pixels in the downstream detection region are not continuous with each other (RC12: NO).

Thus, the status factors S(5) of 2 remains unchanged. Since the target line TL(5) is not the end line EL (line 15) (RC14: NO), the CPU 11 returns to RC1. Next, a process will be described for a case where the target line TL is set to 6. Since a defective pixel DP is present (RC2: YES), the CPU 11 proceeds into RC14. Since the target line (line 6) is not the end line EL (line 15) (RC14: NO), the CPU 11 returns to RC1.

Next, a process will be described for a case where the target line TL is set to 7. Since a defective pixel DP is present in the upstream detection region (RC3: YES), the CPU 11 proceeds into RC5. Numbers of defective pixel UDPN in the upstream detection region is 1, which is less than 10% of numbers of 20 which is the total numbers of pixels in the upstream detection region (RC5: NO). Further, pixels in the upstream detection region are not continuous with each other (RC7: NO). Thus, the status factors S(7) is set to 0. Since a defective pixel DP is not present in the downstream detection region (RC9: NO), the CPU 11 proceeds into RC14. Since the target line (7 line) is not the end line EL (line 15) (RC14: NO), the CPU 11 returns to RC1.

Next, a process will be described for a case where the target line TL is set to line 8. Since a defective pixel DP is present in the upstream detection region (RC3: YES), the CPU 11 advances to the process in RC5. In this case, the upstream defective pixel number UDPN is 1, and the total number of pixels in the upstream detection region is 20. Accordingly, the upstream defective pixel number UDPN is less than 10% of the total number of pixels (RC5: NO). Further, there are no contiguous pixels in the upstream detection region (RC7: NO). As a result, the status factor S(8) is set to 0. Since the defective pixel DP is also present in the downstream detection region (RC9: YES), the CPU 11 advances to the process in RC10. Here, the downstream defective pixel number DDPN is 1, while the total number of pixels in the downstream detection region is 20. Accordingly, the downstream defective pixel number DDPN is less than 10% of the total number of pixels (RC10: NO). Further, since there are no contiguous pixels in the downstream detection region (RC12: NO), the status factor S(8) is maintained at 0. Here, the target line TL (line 8) is not the end line EL (line 15), and the CPU 11 returns to RC1.

Next, a process will be described for a case where the target line TL is set to 9. Since a defective pixel DP is not present in the upstream detection region (RC3: NO), the state factors S(9) is set to 0, Since a defective pixel DP is not present in the downstream detection region (RC9: YES), the CPU 11 advances to the process in RC10. Here, the downstream defective pixel number DDPN is 1, while the total number of pixels in the downstream detection region is 20. Accordingly, the downstream defective pixel number DDPN is less than 10% of the total number of pixels (RC10: NO). Further, since there are no contiguous pixels in the downstream detection region (RC12: NO), the status factor S(9) is maintained at 0. Since the target line (line 9) is not the end line EL (line 15) (RC14: NO), the CPU 11 returns to RC1. Next, a process will be described for a case where the target line TL is set to 10. Since a defective pixel DP is present (RC2: YES), the CPU 11 proceeds into RC14. Since the target line TL (line 10) is not the end line EL (line 15) (RC14: NO), the CPU 11 returns to RC1.

Next, a process will be described for a case where the target line TL is set to 11. Since a defective pixel DP is present in the upstream detection region (RC3: YES), the CPU 11 proceeds into RC5. Numbers of defective pixel UDPN in the upstream detection region is 1, which is less than 10% of numbers of 20 which is the total numbers of pixels in the upstream detection region (RC5: NO). Further, pixels in the upstream detection region are not continuous with each other (RC7: NO). Thus, the status factors S(11) is set to 0. Since a defective pixel DP is not present in the downstream detection region (RC9: NO), the CPU 11 proceeds into RC14. Since the target line (line 11) is not the end line EL (line 15) (RC14: NO), the CPU 11 returns to RC1.

Next, a process will be described for a case where the target line TL is set to 12. Since a defective pixel DP is present in the upstream detection region (RC3: YES), the CPU 11 proceeds into RC5. Numbers of defective pixel UDPN in the upstream detection region is 1, which is less than 10% of numbers of 20 which is the total numbers of pixels in the upstream detection region (RC5: NO). Further, pixels in the upstream detection region are not continuous with each other (RC7: NO). Thus, the status factors S(12) is set to 0. Since a defective pixel DP is not present in the downstream detection region (RC9: NO), the CPU 11 proceeds into RC14. Since the target line (line 12) is not the end line EL (line 15) (RC14: NO), the CPU 11 returns to RC1.

Next, a process will be described for a case where the target line TL is set to 13. Since a defective pixel DP is not present in the upstream detection region (RC3: NO), the state factors S(13) is set to 0. Since a defective pixel DP is not present in the downstream detection region (RC9: NO), the CPU 11 proceeds into RC14. Since the target line (line 13) is not the end line EL (line 15) (RC14: NO), the CPU 11 returns to RC1. Regarding 14 line, and 15 line, since a defective pixel DP is not present in the detection region, the state factors S(14), and S(15) are set to 0, in the same manner of the line 13.

Next, the process for calculating the defective pixel factor DDF will be described for the above example. In this example, the CPU 11 calculates a defective pixel factor D(x) for each of the lines 0, 2, 3, 5, 7, 8, 9, 11, 12, 13, 14, and 15, which have no defective pixels DP stored in the dust-position storage area 14a.

To calculate the defective pixel factor D(0), the CPU 11 totals the upstream line distance factor L(0), the downstream line distance factor R(0), the close pixel distance factor P(0), and status factor S(0). Thus, the CPU 11 sets the defective pixel factor D(0) to 2 (0+2+0+0=2).

To calculate the defective pixel factor D(2), the CPU 11 totals the upstream line distance factor L(2), the downstream line distance factor R(2), the close pixel distance factor P(2), and status factor S(2). Thus, the CPU 11 sets the defective pixel factor D(2) to 6 (2+1+1+2=6).

To calculate the defective pixel factor D(3), the CPU 11 totals the upstream line distance factor L(3), the downstream line distance factor R(3), the close pixel distance factor P(3), and status factor S(3). Thus, the CPU 11 sets the defective pixel factor D(3) to 6 (1+2+1+2=6).

To calculate the defective pixel factor D(5), the CPU 11 totals the upstream line distance factor L(5), the downstream line distance factor R(5), the close pixel distance factor P(5), and status factor S(5). Thus, the CPU 11 sets the defective pixel factor D(5) to 9 (2+2+3+2=9).

To calculate the defective pixel factor D(7), the CPU 11 totals the upstream line distance factor L(7), the downstream line distance factor R(7), the close pixel distance factor P(7), and status factor S(7). Thus, the CPU 11 sets the defective pixel factor D(7) to 2 (2+0+0+0=2).

To calculate the defective pixel factor D(8), the CPU 11 totals the upstream line distance factor L(8), the downstream line distance factor R(8), the close pixel distance factor P(8), and status factor S(8). Thus, the CPU 11 sets the defective pixel factor D(8) to 3 (1+1+1+0=3).

To calculate the defective pixel factor D(9), the CPU 11 totals the upstream line distance factor L(9), the downstream line distance factor R(9), the close pixel distance factor P(9), and status factor S(9). Thus, the CPU 11 sets the defective pixel factor D(9) to 2 (0+2+0+0=2).

To calculate the defective pixel factor D(11), the CPU 11 totals the upstream line distance factor L(11), the downstream line distance factor R(11), the close pixel distance factor P(11), and status factor S(11). Thus, the CPU 11 sets the defective pixel factor D(11) to 2 (2+0+0+0=2).

To calculate the defective pixel factor D(12), the CPU 11 totals the upstream line distance factor L(12), the downstream line distance factor R(12), the close pixel distance factor P(12), and status factor S(12). Thus, the CPU 11 sets the defective pixel factor D(12) to 1 (1+0+0+0=1).

To calculate the defective pixel factor D(13), the CPU 11 totals the upstream line distance factor L(13), the downstream line distance factor R(13), the close pixel distance factor P(13), and status factor S(13). Thus, the CPU 11 sets the defective pixel factor D(13) to 0 (0+0+0+0=0). Similarly to the defective pixel factor D(13), the CPU 11 sets the defective pixel factors D(14) and D(15) to 0.

Since the defective pixel factor DDF is smallest for lines 13, 14, and 15 in this example, the CPU 11 sets the scan position SP to line 13 because line 13 is the sub-scanning position farthest upstream in the sub-scanning direction, i.e., closest to the white reference plate 61.

[Effects of the Embodiment]

In the process for calculating the line distance factors LDF (R3) of the embodiment, the CPU 11 calculates distances LVS and RVS between the target line TL and defective pixels DP present in the respective detection regions, and sets the line distance factors LDF to larger values for closer distances. In the process for calculating the defective pixel factors DDF (R6), the CPU 11 determines the defective pixel factor DDF by adding the line distance factors LDF to other factors. In the process for setting the scan position SP (R7), the CPU 11 selects the line having the smallest defective pixel factor DDF as the scan position SP. Accordingly, the CPU 11 can set the scan position SP to a position away from defective pixels DP, reducing the likelihood of streaks being produced in the scanning results.

In the process for calculating the close pixel distance factors CDF (R4) in the embodiment, the CPU 11 sets the close pixel distance factor CDF to a value greater than 0 when the closest distance between defective pixels DP on the upstream side of the target line TL and defective pixels DP on the downstream side of the target line TL is no greater than 5. In the process for calculating the defective pixel factors DDF (R6), the CPU 11 determines the defective pixel factor DDF by adding the close pixel distance factor CDF to other factors. In the process for setting the scan position SP (R7), the CPU 11 selects the line having the smallest defective pixel factor DDF as the scan position SP. Hence, the CPU 11 can set the scan position SP to a position for which the shortest distance between defective pixels DP on upstream and downstream sides is greater than 5, thereby achieving reading results less likely to be affected by defective pixels DP on the upstream or downstream side of the target line TL.

In the process for calculating the status factors DSF (R5) in the embodiment, the CPU 11 sets the status factor DSF to a value greater than 0 when the number of defective pixels present in a detection region corresponding to the target line TL is 10% or more of the total number of pixels in the detection region. In the process for calculating the defective pixel factors DDF (R6), the CPU 11 determines the defective pixel factor DDF by adding the status factor DSF to other factors. In the process for setting the scan position SP (R7), the CPU 11 sets the scan position SP to the line having the smallest defective pixel factor DDF. Accordingly, the CPU 11 can set the scan position SP to a position for which the number of defective pixels in a peripheral area is less than 10% of the total number of pixels in the peripheral area, thereby achieving reading results less likely to be influenced by defective pixels DP present around the target line TL.

In the process for calculating the status factors DSF (R5) in the embodiment, the CPU 11 sets the status factor DSF to a value greater than 0 when there are contiguous defective pixels present in a detection region corresponding to the target line TL. In the process for calculating the defective pixel factors DDF (R6), the CPU 11 determines the defective pixel factor DDF by adding the status factor DSF to other factors. In the process for setting the scan position SP (R7), the CPU 11 sets the scan position SP to the line having the smallest defective pixel factor DDF. Accordingly, the CPU 11 can set the scan position SP to a position around which no large foreign matter exists, thereby achieving reading results that are even less likely to be influenced by defective pixels DP present around the target line TL.

The image reading device 10 and the reading unit 17 are example of an image reading device and a reading unit, respectively. The flatbed motor MT2 and the drive circuit 18 are examples of a drive unit. The ADF 19 is an example of a sheet conveying unit. The CPU 11 and the flash PROM 14 are examples of a processor and a storing unit, respectively. One line worth reading process (RD1) and a process of determining whether the one line worth of gradation value is greater than the threshold value (RD3) are example of a step to detect whether there is a defective pixel. The process for storing the position of the pixel as the position of defective pixel (RD4) is an example a step to store position of the detected defective pixel. The process for calculating line distance factors LDF (R3) and the process for calculating defective pixel factor DDF (R6) are examples of a step to calculate defective factor and a step to calculate a line distance factor. The scan position SP setting process (R7) is an example of a step to set a position.

The process for storing the position of the target pixel as the position of defective pixel (RD4) is an example of a step to store a position. The process for calculating the close pixel distance factors CDF is an example of a step to calculate a proximate pixel distance factor. The process for calculating the status factors DSF (R5) is an example of a step to calculate number of defective pixels. The process of calculating the status factors DSF (R5) is an example of a contiguous pixel factor.

[Modifications]

While the disclosure has been described in detail with reference to the above embodiments thereof, it would be apparent to those skilled in the art that various changes and modifications may be made therein.

(1) The image reading device 10 according to the embodiment can be applied to a device such as a multi-function peripheral provided with a printer as long as the device is provided with an ADF capable of reading an original image.

(2) The image-reading device 10 according to the embodiment detects defective pixels and stores the detected positions of these pixels in the flash PROM 14 after completing the reading process, but the image-reading device may detect defective pixels prior to reading or may detect defective pixels when instructed by the user.

(3) In the embodiment described above, the image-reading device 10 detects defective pixels at a scan position used in the reading process, but the image-reading device may be configured to detect defective pixels for the entire scanning area (or the entire search region) at one time.

(4) When calculating the line distance factor LDF in the embodiment described above, the CPU 11 calculates an upstream line distance factor and a downstream line distance factor by subtracting the respective distances LVS and RVS from the number of lines Th and adding 1 to each of the differences, and calculates the defective pixel factor DDF by summing the downstream line distance factor and the upstream line distance factor. However, the CPU 11 may calculate the defective pixel factor DDF based on only the upstream line distance factor, without adding the downstream line distance factor. This method can eliminate streaks caused by foreign matter moved from the upstream side by the conveyed original.

(5) When calculating the line distance factor LDF in the embodiment described above, the CPU 11 calculates an upstream line distance factor and a downstream line distance factor by subtracting the respective distances LVS and RVS from the number of lines Th and adding 1 to each of the differences, and calculates the defective pixel factor DDF by adding the downstream line distance factor to the upstream line distance factor. However, the CPU 11 may calculate the distance with respect to the main scanning direction between a main scanning region and defective pixels. Here, the main scanning region is a region in the main scanning direction that is actually scanned. In this case, the CPU 11 calculates the defective pixel factor DDF based on this distance.

(6) In the process for calculating the status factors DSF, the status factor $S(x)$ is incremented by 1 when the defective pixels are contiguous (RA7, RA8, RA10, and RA11). The increment (or the value added to $S(x)$) may be varies depending on the number of contiguous defective pixels. That is, the larger the number of contiguous defective pixels is, the larger value the status factor $S(x)$ is incremented by. For example, when the number of contiguous defective pixels is 2, the status factor $S(x)$ is incremented by 1. When the number of contiguous defective pixels is larger than 2 and smaller than or equal to 4, the status factor $S(x)$ is incremented by 2. When the number of contiguous defective pixels is larger than 4, the status factor $S(x)$ is incremented by 3.

(7) In R6 the CPU 11 calculates the defective pixel factor DDF by using the upstream line distance factor $L(x)$, the downstream line distance factor $R(x)$, the close pixel distance factor $P(x)$, and the status factor $S(x)$. However, the defective pixel factor DDF may be calculated on the basis of at least one of the upstream line distance factor $L(x)$, the downstream line distance factor $R(x)$, the close pixel distance factor $P(x)$, and the status factor $S(x)$.

What is claimed is:

1. An image reading device comprising:
   a sheet conveying unit configured to convey an original in a sub-scanning direction;
   a reading unit configured to read information made up of pixels on a line-to-line basis at a reading position, the reading position being selected from a plurality of lines arranged in a prescribed range in the sub-scanning direction, each of the plurality of lines extending in a main scanning direction;
   a pressing member configured to press the original conveyed by the sheet conveying unit toward the reading unit;
   a drive unit configured to move the reading unit in the sub-scanning direction so that the reading unit is positioned at the reading position;

a storing unit configured to store a plurality of defective positions; and a processor configured to:

control the reading unit to read the pressing member to obtain one line worth of pixels at a position of selected one of the plurality of lines and detect whether there is a defective pixel in the one line worth of pixels;

store a position of the detected defective pixel, as one of the plurality of defective positions, in the storing unit;

set defective factors for respective normal positions, each of the normal positions being a position in the sub-scanning direction and indicating one of the plurality of lines having no defective pixel, wherein each of the defective factors is set to a function depending on a distance between the each of the normal positions and one defective position, which is from among the plurality of defective positions and is positioned within a specific range from the each of the normal positions, so that the closer the distance is, the larger the defective factor of the each of the normal positions is set; and set the reading position having a smallest defective factor from among the normal positions, wherein the reading unit reads the original conveyed by the sheet conveying unit at the set reading position.

2. The image reading device according to claim 1, wherein the processor is further configured to calculate a line distance factor for the each of the normal positions to obtain the defective factor by subtracting, from a specific value, the distance, the specific value indicating a length of the specific range.

3. The image reading device according to claim 2, wherein the processor is further configured to calculate an upstream line distance factor and a downstream line factor for the each of the normal positions, calculate a sum of the upstream line distance factor and the downstream line factor for the each of the normal positions, and update a new the defective factor for the each of the normal positions by adding the sum to the current defective factor for the each of the normal positions, the upstream line distance factor being obtained by subtracting, from the specific value, a distance between the each of the normal positions and an upstream defective position, the upstream defective position being one defective position that is from among the plurality of defective positions and is positioned at upstream of the each of the normal positions in the sub-scanning direction within the specific range from the each of the normal positions, the downstream line distance factor being obtained by subtracting, from the specific value, a distance between the each of the normal positions and a downstream defective position, the downstream defective position being one defective position that is from among the plurality of defective positions and is positioned at downstream of the each of the normal positions in the sub-scanning direction within the specific range from the each of the normal positions.

4. The image reading device according to claim 1, wherein the processor is further configured to:

calculate a minimum distance between an upstream defective position and a downstream defective position for the each of the normal positions, and set, when the minimum distance is shorter than a prescribed distance, a proximate pixel distance factor for the each of the normal positions, wherein the shorter the minimum distance is, the larger proximate pixel distance is set, the upstream defective position being one defective position that is from among the plurality of defective positions and is positioned at upstream of the each of the normal positions in the sub-scanning direction within the specific range from the each of the normal positions, the downstream defective position being one defective position that is from among the plurality of defective positions and is positioned at downstream of the each of the normal positions in the sub-scanning direction within the specific range from the each of the normal positions; and set a new defective factor by adding the proximate pixel distance factor to the current defective factor for the each of the normal positions.

5. The image reading device according to claim 1, wherein the processor is further configured to:

calculate, for the each of the normal positions, number of defective pixels in the specific range from the each of the normal positions, and set a defective pixel number factor for the each of the normal positions, wherein the larger the number of defective pixels is, the larger defective pixel number factor is set; and update the defective factor by adding the defective pixel number factor to the current defective factor for the each of the normal positions.

6. The image reading device according to claim 1, wherein the processor is further configured to:

set a contiguous pixel factor for the each of the normal positions when defective pixels in the specific range from the each of the normal positions are contiguous in the main scanning direction or the sub-scanning direction, wherein the larger the number of the contiguous pixels is, the larger contiguous pixel factor is set; and update the defective factor by adding the contiguous pixel factor to the current defective factor for the each of the normal positions.

7. An image reading device comprising:

a sheet conveying unit configured to convey an original in a sub-scanning direction;

a reading unit configured to read information made up of pixels on a line-to-line basis at a reading position, the reading position being selected from a plurality of lines arranged in a prescribed range in the sub-scanning direction, each of the plurality of lines extending in a main scanning direction;

a pressing member configured to press the original conveyed by the sheet conveying unit toward the reading unit;

a drive unit configured to move the reading unit in the sub-scanning direction so that the reading unit is positioned at the reading position;

a storing unit configured to store a plurality of defective positions; and a processor configured to:

control the reading unit to read the pressing member to obtain one line worth of pixels at a position of selected one of the plurality of lines and detect whether there is a defective pixel in the one line worth of pixels;

store a position of the detected defective pixel, as one of the plurality of defective positions, in the storing unit;

acquire a first distance between a first normal position and one defective position that is from among the plurality of defective positions and is positioned within a first specific range from the first normal position, the first normal position being a position in the sub-scanning direction and indicating one of the plurality of lines having no defective pixel;

acquire a second distance between a second normal position and one defective position that is from among the plurality of defective positions and is positioned within a second specific range from the second normal position, the second normal position being a position in the sub-scanning direction, indicating one of the plurality of lines having no defective pixel, and different from the first normal position;

set the reading position to the first normal position when the first distance is longer than the second distance; and set the reading position to the second normal position when the second distance is longer than the first distance, wherein the reading unit reads the original conveyed by the sheet conveying unit at the set reading position.

8. An image reading device comprising:

a sheet conveying unit configured to convey an original in a sub-scanning direction;

a reading unit configured to read information made up of pixels on a line-to-line basis at a reading position, the reading position being selected from a plurality of lines arranged in a prescribed range in the sub-scanning direction, each of the plurality of lines extending in a main scanning direction;

a pressing member configured to press the original conveyed by the sheet conveying unit toward the reading unit;

a drive unit configured to move the reading unit in the sub-scanning direction so that the reading unit is positioned at the reading position;

a storing unit configured to store a plurality of defective positions; and a processor configured to:

control the reading unit to read the pressing member to obtain one line worth of pixels at a position of selected one of the plurality of lines and detect whether there is a defective pixel in the one line worth of pixels;

store a position of the detected defective pixel, as one of the plurality of defective positions, in the storing unit;

acquire distances for respective normal positions, each of the normal positions being a position in the sub-scanning direction and indicating one of the plurality of lines having no defective pixel, each of the distances being between a respective normal position and one defective pixel position that is from among the plurality of defective positions and is positioned within a specific range from the respective normal position; and set the reading position to one of the normal positions having a largest distance among the acquired distances, wherein the reading unit reads the original conveyed by the sheet conveying unit at the set reading position.

* * * * *